(12) United States Patent
Yano

(10) Patent No.: US 6,568,815 B2
(45) Date of Patent: May 27, 2003

(54) PICTURE PROJECTION APPARATUS

(75) Inventor: Tomoya Yano, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/784,090

(22) Filed: Feb. 16, 2001

(65) Prior Publication Data

US 2001/0021004 A1 Sep. 13, 2001

(30) Foreign Application Priority Data

Feb. 18, 2000 (JP) ........................................ 2000-046833

(51) Int. Cl.[7] .............................................. G03B 21/14
(52) U.S. Cl. ........................................... 353/84; 353/31
(58) Field of Search ............................. 353/31, 84, 20; 348/742, 743

(56) References Cited

U.S. PATENT DOCUMENTS

| | | | | |
|---|---|---|---|---|
| 5,122,890 A | * | 6/1992 | Makow ........................ 349/96 |
| 5,347,378 A | * | 9/1994 | Handschy et al. .......... 349/102 |
| 5,517,340 A | * | 5/1996 | Doany et al. ................ 348/742 |
| 5,658,490 A | * | 8/1997 | Sharp et al. ........... 252/299.01 |
| 5,833,338 A | * | 11/1998 | Barak ............................ 349/9 |
| 5,863,125 A | * | 1/1999 | Doany ........................ 348/743 |
| 5,921,650 A | * | 7/1999 | Doany et al. ................ 348/743 |
| 5,953,083 A | * | 9/1999 | Sharp ........................... 349/18 |
| 6,280,034 B1 | * | 8/2001 | Brennesholtz .............. 348/742 |

OTHER PUBLICATIONS

Sharp, G.D. et al, "retarder Stack Technology for Color Manipulation", SID 99 Digest, pp 1072–1075.*

* cited by examiner

*Primary Examiner*—Alan A. Mathews
*Assistant Examiner*—D. Ben Esplin
(74) *Attorney, Agent, or Firm*—Rader, Fishman & Grauer PLLC; Ronald P. Kananen, Esq.

(57) ABSTRACT

An image projection apparatus according to the present invention includes a prime color component selection unit, made up of a temporal color separation sub-unit and a spatial color separation sub-unit, a modulation unit on which falls a light beam split in its optical path by the prime color component selection unit, and a projection unit for synthesizing and projecting the light beams from first and second spatial modulation sub-units of the modulation unit. In the image projection apparatus, the first and second spatial modulation sub-units perform spatial modulation on images corresponding to respective different prime color components. In the image projection apparatus of the present invention, two spatial modulation units are used, thus simplifying the structure and reducing the size as compared to the so-called three-plate type image projection apparatus employing three spatial modulation sub-units.

40 Claims, 26 Drawing Sheets

$\Delta nd1 - \Delta nd2 = 228nm$

PICTURE PROJECTION APPARATUS

BACKGROUND OF THE INVENTION

1. Field of the Invention

This invention relates to a picture projection apparatus for projecting a picture displayed by spatial modulation means employing e.g., a liquid crystal panel.

2. Description of Related Art

Such picture projection apparatus is comprised of three liquid crystal panels 101a, 101b, 101c, as transmission type spatial modulation means, as shown in FIG. 1. In this picture projection apparatus, a light beam radiated from a light source 102, such as a halogen lamp, falls on a polarized light conversion system 104, through an integrator 103, to become a unidirectional linear-polarized light beam. The polarized light conversion system 104 includes a large number of polarized light beam splitters, a mirror and a ½ wavelength plate arranged in association with these polarized light beam splitters. In this polarized light conversion system 104, the light beam transmitted through the respective polarized light beam splitters are P-polarized light beams relative to the reflective surfaces of the polarized light beam splitters. The light beam reflected by the polarized light beam splitters are transmitted through the ½ wavelength plate to prove P-polarized light beam with respect to the reflective surfaces of the polarized light beam splitters.

A light beam through the polarized light conversion system 104 is reflected through a first condenser lens 105a by a first mirror 106a to fall on a first dichroic mirror 107a. In the light beam incident on this first dichroic mirror 107a, a first prime color component is transmitted, whilst the second and third prime color components are reflected. The first prime color component, transmitted through the first dichroic mirror 107a, is reflected by a second mirror 106a to fall through a second condenser lens 105b on a first liquid crystal panel 101a. This first liquid crystal panel 101a displays an image corresponding to the first prime color component to modulate the transmitted light in keeping with this image.

The second and third prime color components, reflected from the first dichroic mirror 107a, are incident on a second dichroic mirror 107b. In the light beam, incident on the second dichroic mirror 107b, the second prime color component is reflected, whilst the third prime color component is transmitted. The second prime color component, reflected by the second dichroic mirror 107b, falls through a third condenser lens 105c on the second liquid crystal panel 101b. This second liquid crystal panel 101b displays an image corresponding to the second prime color component and modulates the transmitted light in keeping with this image.

The third prime color component, transmitted through the second dichroic mirror 107b, is transmitted through a fourth condenser lens 105d, a third mirror 106c, a fifth condenser lens 105e, a fourth mirror 106d and a sixth condenser lens 105f in this order to fall on the third liquid crystal panel 101c. The third liquid crystal panel 101c displays an image corresponding to the third prime color component and modulates the transmitted light in keeping with the displayed image.

The light beams, transmitted through the first to third liquid crystal panels 101a to 101c, are incident from three directions on and synthesized by a dichroic prism 109 to exit from this dichroic prism 109. The light beam exiting from this dichroic prism 109 falls on a projection lens 110 so as to be projected on a screen, not shown. The light beam exiting from the dichroic prism 109 is synthesized from three prime color components, so that a color image is projected by a projection lens 110.

A certain known image projection device is made up of three liquid crystal panels 111a, 111b, 111c, as reflection type spatial modulation means, as shown in FIG. 2. In this image projection device, a light beam exiting from a light source 102 falls through an integrator 103 on the polarized light conversion system 104 to prove a unidirectional linear polarized light beam. The light beam transmitted through the polarized light conversion system 104 is reflected through the first condenser lens 105a by a mirror 106 so as to fall through the second condenser lens 105b on a polarizing beam splitter 112.

The incident light beam on the polarizing beam splitter 112 is an S-polarized light relative to the reflective surface of the polarizing beam splitter 112 and is reflected on a reflecting surface to fall on a first dichroic prism 113a. In the light beam, incident on the first dichroic prism 113a, the first prime color component is reflected on the inner prism surface, while the second and third prime color components are transmitted. The first prime color component, reflected by the inner surface of the first dichroic prism 113a, falls on the first liquid crystal panel 111a. This first liquid crystal panel 111a displays an image corresponding to the first prime color component and modulates and reflects the incident light in keeping with the image.

The second and third prime color components, transmitted through the first dichroic prism 113a, fall on the second dichroic prism 113b. In the light beam incident on the second dichroic prism 113b, the second prime color component is reflected by the inner prism surface, while the third prime color component is transmitted. The second prime color component, reflected by the inner surface of the second dichroic prism 113b, falls on the second liquid crystal panel 111b. This second liquid crystal panel 111b displays an image corresponding to the second prime color component and modulates and reflects the incident light in keeping with the image.

The third prime color component, transmitted through the second dichroic prism 113b, falls through the prism 113c on the third liquid crystal panel 111c. This third liquid crystal panel 111c displays an image corresponding to the third prime color component and modulates and reflects the incident light in keeping with the image.

The light beam, reflected by the first to third liquid crystal panels 111a to 111c, are synthesized by inversely following an optical path comprising the liquid crystal panels 111a, 111b and 111c to exit from the first dichroic prism 113a to fall on the polarizing bean splitter 112. The incident light beam on the polarizing beam splitter 112 is the p-polarized light relative to the reflecting surface of the polarizing beam splitter 112 and is transmitted through the reflecting surface to fall on the projection lens 110. The light beam exiting from the first dichroic prism 113a is synthesized from three prime color components, so that a color image is projected by a projection lens 110.

The image projection device is made up of three liquid crystal panels in order to display images corresponding to the three prime colors of red (R), green (G) and blue (B).

The above-described image projection device has many optical components, especially if it is provided with a transmission type liquid crystal panel, and hence is complex to assemble and fabricate. Moreover, if the liquid crystal panel is of the transmission type, the aperture ratio is low because of the necessity of providing the wiring etc.

If the reflection type liquid crystal panel is used, it is possible to reduce the size and to increase the aperture ratio as compared to the case in which the transmission type liquid crystal panel is used. However, if the reflection type liquid crystal panel is used, the length between the liquid crystal panel and the projection lens is increased as compared to the case in which the transmission type liquid crystal panel is used, with the back focus of the projection lens being longer. So, a projected image with a sufficient luminosity cannot be realized except if the diameters of the projection lens and the polarizing beam splitter are increased.

SUMMARY OF THE INVENTION

It is therefore an object of the present invention to provide an image projection apparatus which, with the reduced number of components, is easy to assemble and fabricate, which can be reduced in size and which allows to produce a projected image having sufficient luminosity.

In one aspect, the present invention provided an image projection apparatus including prime color component selection means made up of temporal color separation means and spatial color separation means, with the temporal color separation means removing one of prime color components and leaving the remaining two prime color components, in the incident light, the temporal color separation means sequentially changing the one prime color component as time elapses, the spatial color separation means separating the optical path of the one prime color component of the incident light from the optical path of the other two prime color components. The image projection apparatus also include modulation means made up of first spatial modulation means, on which falls one of split light beams, the optical path of which has been separated by the prime color component selection means, and second spatial modulation means, on which falls the other split light beam and projection means for synthesizing and projecting the light beams passed through the spatial modulation means in the modulation means. The first and second spatial modulation means performs spatial modulation on an image corresponding to one respectively different prime color component of the incident light in each operating state of the temporal color separation means.

An image projection apparatus according to the present invention includes a prime color component selection unit, made up of a temporal color separation sub-unit and a spatial color separation sub-unit, a modulation unit on which falls a light beam split in its optical path by the prime color component selection unit, and a projection unit for synthesizing and projecting the light beams from first and second spatial modulation sub-units of the modulation unit. In the image projection apparatus, the first and second spatial modulation sub-units perform spatial modulation on images corresponding to respective different prime color components. In the image projection apparatus of the present invention, two spatial modulation units are used, thus simplifying the structure and reducing the size as compared to the so-called three-plate type image projection apparatus employing three spatial modulation sub-units.

In this image projection apparatus, luminosity of the projected image equivalent to or superior to the "three plate type" is realized, while color balance can be adjusted depending on coloration characteristics of the light source.

In this image projection apparatus, the problem of an edge color (color breakup), in the so-called field sequential color representation performing time division display of each prime color, can be alleviated.

That is, with the image projection apparatus of the present invention, the number of component parts can be reduced to provide for facilitated manufacture and small size as well as a to assure a projected image of sufficient lightness.

DESCRIPTION OF THE PREFERRED EMBODIMENTS

Figure 1:
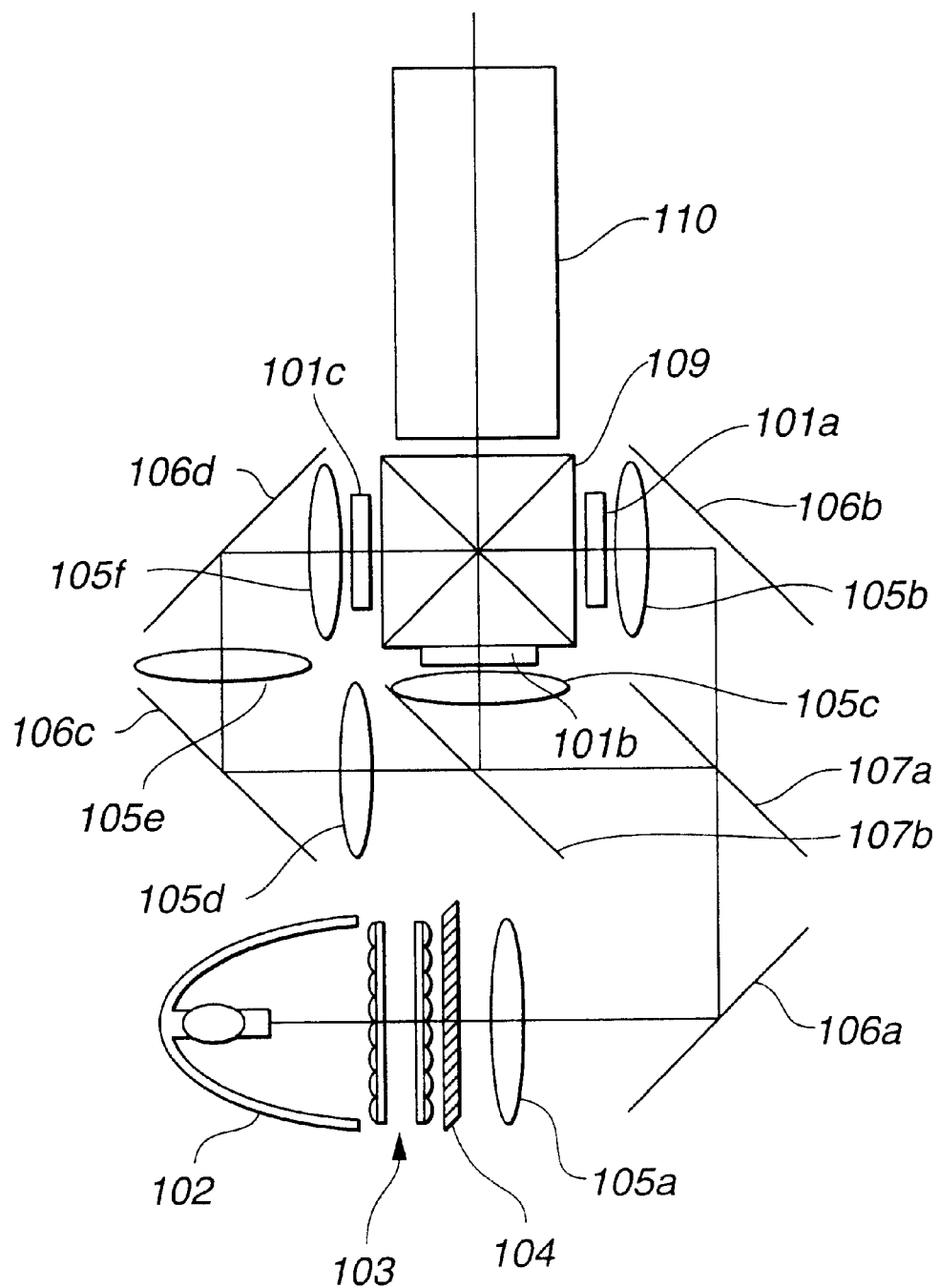
FIG. 1 is a side view showing a configuration of a conventional image projection apparatus employing three transmission type liquid crystal panels.
Figure 2:
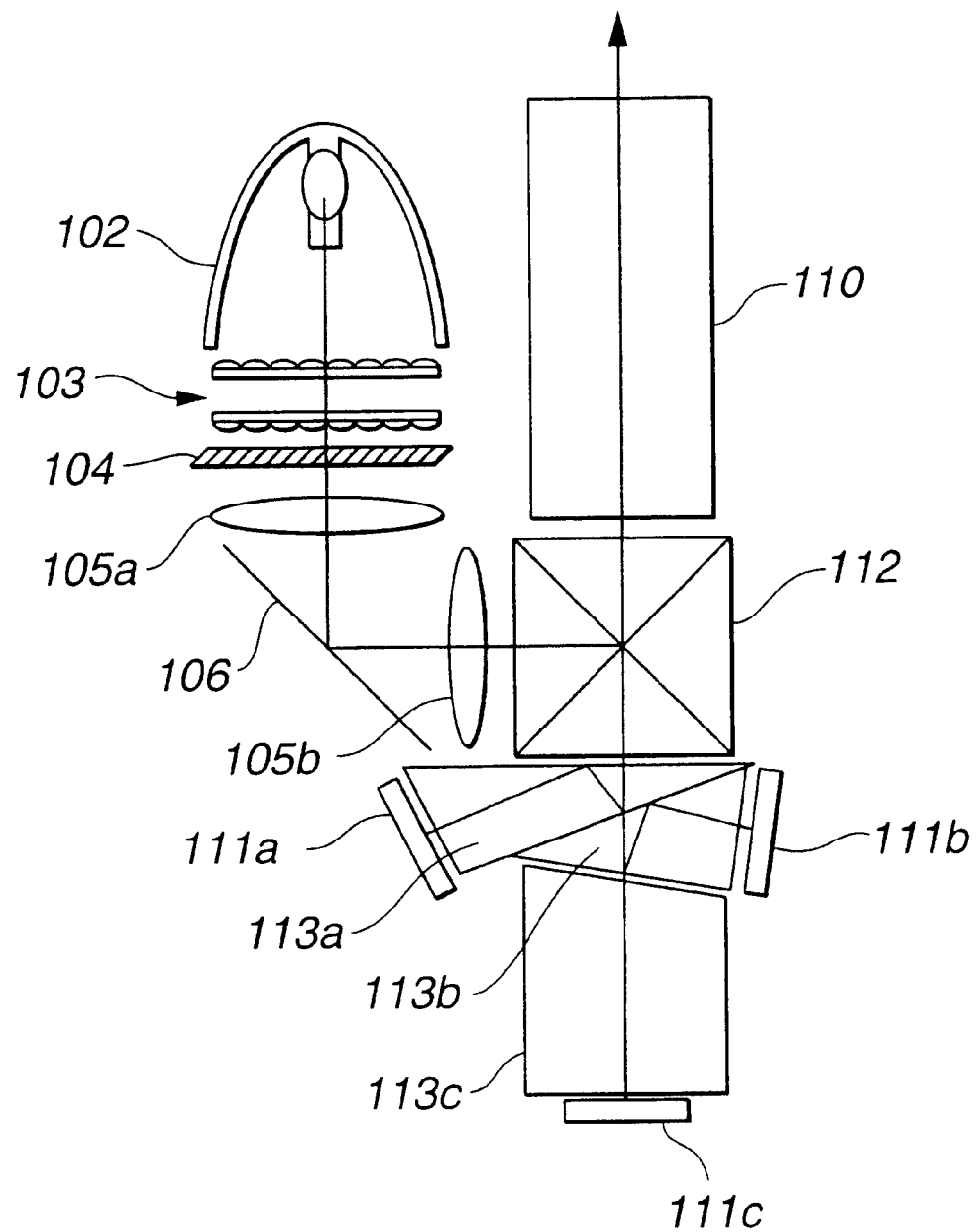
FIG. 2 is a side view showing a configuration of a conventional image projection apparatus employing three reflection type liquid crystal panels.

Referring to the drawings, preferred embodiments of the present invention will be explained in detail.

Figure 3:
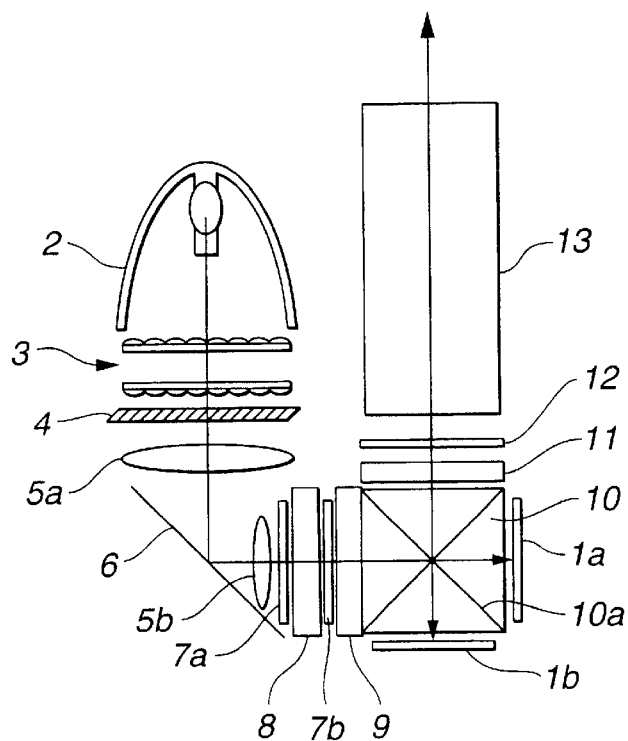
FIG. 3 is a side view showing a configuration of an image projection apparatus according to the present invention.

Referring to FIG. 3, an image projection apparatus according to the present invention includes modulation means, made up of first and second liquid crystal panels 1a, 1b, as reflection type spatial modulation means.

In this image projection apparatus, a light beam exiting from a light source 2 such as a halogen lamp is incident through an integrator 3 on a polarized light conversion system 4 so as to be converted to a unidirectional linearly polarized light beam. The polarized light conversion system 4 is made up of a large number of polarizing beam splitters with associated mirrors and ½ wavelength plates. In this polarized light conversion system 4, the light beam transmitted through each polarizing beam splitter is the P-polarized light with respect to the reflecting surface of this polarizing beam splitter. On the other hand, the light beam reflected by the polarizing beam splitter becomes P-polarized light with respect to the polarizing beam splitter by being transmitted through the ½ wavelength plate.

The light beam transmitted through the polarized light conversion system 4 is reflected through a first condenser lens 5a by a mirror 6 so as to fall through a second condenser lens 5b on prime color component selection means. This prime color component selection means is made up of a first polarizing plate 7a, a color switching element 8 as temporal color separation means, a second polarizing plate 7b as polarization selecting element, a color separation element 9 as spatial color separation means, and a cubic polarizing beam splitter 10, arrayed in this order. This polarizing beam splitter 10 has a polarization-dependent reflecting plate 10a. The polarizing plates 7a, 7b transmit only light beams in pre-set polarizing directions.

The color switching element 8 provide for the state of the polarized light of one of the prime color components of the incident light which is different from that of the other two prime color components, and is able to sequentially switch the one prime color component with lapse of time. For example, during a first period, the color switching element 8 provides for a polarized state of the first prime color component of the white incident light which is different from, that is perpendicular to, the polarized states of the second and third prime color components. During the next following second period, the color switching element 8 provides for a polarized state of the second prime color component of the white incident light different from, that is perpendicular to, the polarized states of the first and third prime color components. The color switching element 8 operates for sequentially repeating the first and second periods 24.

Such color switching element 8 can be constructed using a liquid crystal cell and a phase difference plate. For example, a product marketed by Color Link Inc. under the trade name of "Color Switch" is this color switching element.

As the outgoing light beam of the color switching element 8 is transmitted through the second polarizing plate 7b, one of the prime color components of the incident light beam to the color switching element 8 is removed, such that the remaining two prime color components are left, that is transmitted. This one prime color component is switched sequentially with lapse of time.

Figure 4:
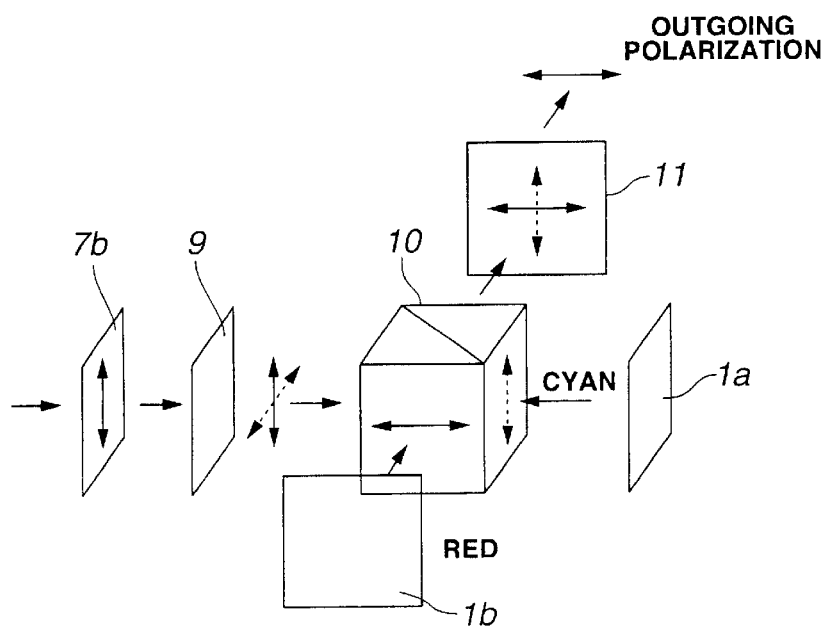
FIG. 4 is a perspective view showing the functions of a color separation element and a color synthesis element in the image projection apparatus according to the present invention.

The color separation element 9 has the function of shifting the axis of light polarization of the prime color component desired to be removed in a direction perpendicular to the axis of light polarization of the incident light beam, as shown in FIG. 4. That is, the color separation element 9 provides for a state of light polarization of one of the prime color components of the incident light which is different from the state of light polarization of the other two prime color components, so that, by using the color separation element 9 in conjunction with the polarizing beam splitter 10, it is possible to provide for an optical path of the prime color component which is different from the optical paths of the remaining two prime color components.

The color separation element 9 can be constructed by layering phase difference plates. Such color separation element is reported in e.g., "SID99 Digest", pages 1072 to 1075, while being marketed from the Color Link Inc. under the trade name of Color Select.

Such color separation element 9 and polarizing beam splitter 10 are to be used in which only the third prime color component is reflected as an S-polarized light with respect to the reflecting surface 10a of the polarizing beam splitter 10. In consideration of the operation of the above-mentioned color switching element 8, in the present polarizing beam splitter 10, only the second and third prime color components are incident, during the first time period, by the operation of the second polarizing plate 7b, whilst only the second prime color component is transmitted through the reflecting surface 10a of the polarizing beam splitter 10 and only the third prime color component is reflected by the reflecting surface 10a of the polarizing beam splitter 10. Moreover, in the present polarizing beam splitter 10, only the first and third prime color components are incident, during the second time period, by the operation of the second polarizing plate 7b, whilst only the first prime color component is transmitted through the reflecting surface 10a of the polarizing beam splitter 10, and only the third prime color component is reflected by the reflecting surface 10a.

In the light beam incident on the polarizing beam splitter 10, the light beam transmitted through the reflecting surface 10a is incident on the first liquid crystal panel 1a, whilst the light beam reflected by the reflecting surface 10a is incident on the second liquid crystal panel 1b.

During the above-mentioned first time period, the first liquid crystal panel 1a displays an image corresponding to the second prime color component, and modulates and reflects the incident light in keeping with this image. During the second time period, the first liquid crystal panel 1a displays an image corresponding to the first prime color component, and modulates and reflects the incident light in keeping with this image. The second liquid crystal panel 1b displays an image corresponding to the third prime color component, during the first and second time periods, and modulates and reflects the incident light in keeping with this image.

The light beam reflected back from the first and second liquid crystal panels 1a, 1b are polarized in a direction perpendicular to the direction of light polarization of the incident light beams to the liquid crystal panels 1a, 1b to revert to the polarizing beam splitter 10 so as to be then synthesized on the reflecting surface 10a of the polarizing beam splitter 10 to exit from the polarizing beam splitter 10. The outgoing light beam from the polarizing beam splitter 10 falls on light projection means. The light projection means is made up of a color synthesis device 11, a third polarizing plate 12 and a projection lens 13.

Similarly to the color separation element 9, the color synthesis device 11 may be constructed by layering phase difference plates together. The color synthesis device 11 has the function of converting light beams of different color components having the axes of polarization perpendicular to one another into unidirectional linear polarized light beams for unifying these light beams together.

The light beam radiated from the color synthesis device 11 is transmitted through the third polarizing plate 12 by the projection lens 13 so that a colored image is projected on a screen, not shown. Meanwhile, the third polarizing plate 12 is arranged with its axis of polarization oriented to permit transmission of the outgoing linear-polarized light beam from the color synthesis device 11.

If integrated with respect to time, the radiated light beam from the polarizing beam splitter 10 is synthesized from the three prime color components, so that a color image is projected by the projection lens 13.

In constructing the image projection apparatus, a polarizing beam splitter 14 in the shape of a hexagonal prism may be used in place of a cubic polarizing beam splitter 10 of the above-described embodiment. The polarizing beam splitter 14 has a polarization dependent reflecting surface 14a.

In this image projection apparatus, the configuration of the optical system for causing the light beam to fall on the polarizing beam splitter 14, the status of the light beam, the configuration of the optical system on which falls the light beam radiated from the polarizing beam splitter 14 and the status of the light beam are similar to those of the above-described embodiment. Meanwhile, in the image projection apparatus shown in FIG. 5, the mirror 6 has been eliminated from the light path extending from the light source 2 to the polarizing beam splitter 14.

In the image projection apparatus of the present invention, any suitable optical devices, having the function of separating the light beam depending on the direction of polarization, may be used in addition to the above-described polarizing beam splitters 10, 14.

Figure 6:
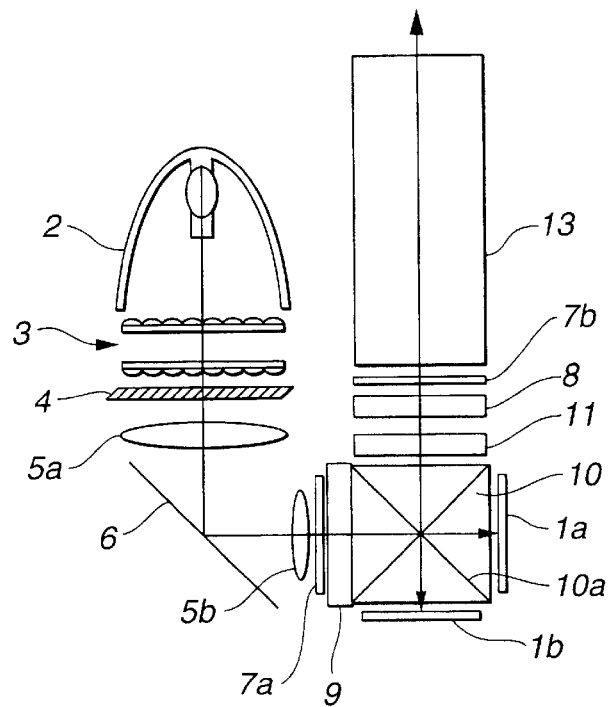
FIG. 6 is a side view showing an image projection device of the present invention with a color switching element arrayed at back of a polarizing beam splitter.
Figure 7:
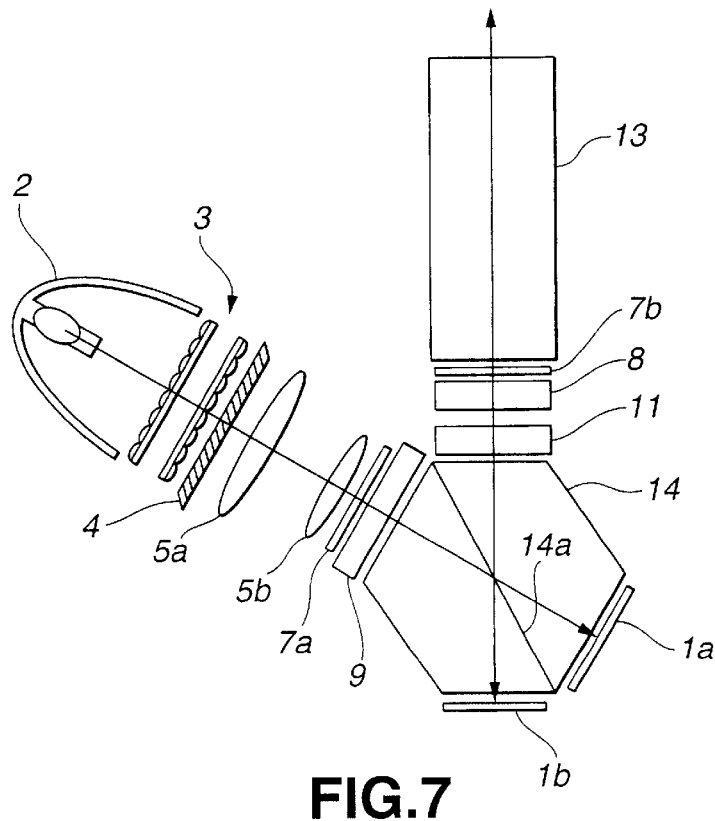
FIG. 7 is a side view showing an image projection device of the present invention with a color switching element arrayed at back of a polarizing beam splitter of a hexagonal prismatic shape.

In the above-described respective embodiments, the color switching element 8 is arranged on the light path between the light source 2 and the polarizing beam splitters 10, 14. However, in the image projection apparatus of the present invention, the color switching element 8 may be arranged on the light path of the light beam radiated from the polarizing beam splitters 10, 14. In the image projection apparatus shown in FIG. 6, the cubically-shaped polarizing beam splitter 10 is used, whereas, in the image projection apparatus, shown in FIG. 7, the polarizing beam splitter 14 in the form of a hexagonal prism is used.

In this case, the light beam from the light source falls on the polarizing beam splitters 10, 14 through an integrator 3, a first condenser lens 5a, a mirror 6, a second condenser lens 5b, a first polarizing plate 7a and a color separation element 9. The mirror 6 may be eliminated. The light beam exiting the polarizing beam splitters 10, 14 falls on the projection lens 13 through the color synthesis device 11, color switching element 8 and the second condenser lens 5b. That is, the color switching element 8 is arranged between the color synthesis device 11 and the projection lens 13.

Figure 8:
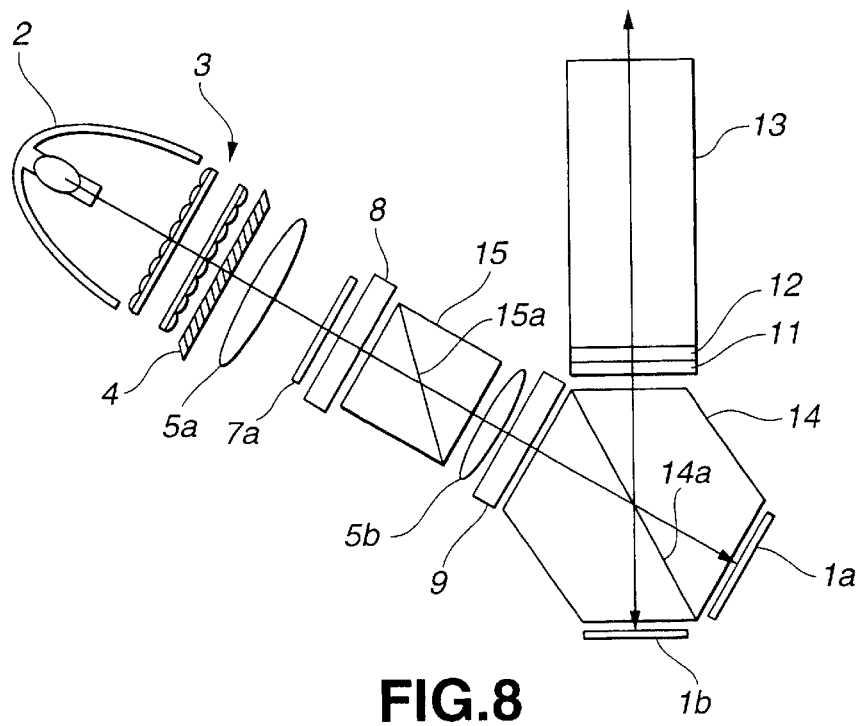
FIG. 8 is a side view showing an image projection device of the present invention formed by a polarizing beam splitter in place of the polarizing filter.
Figure 9:
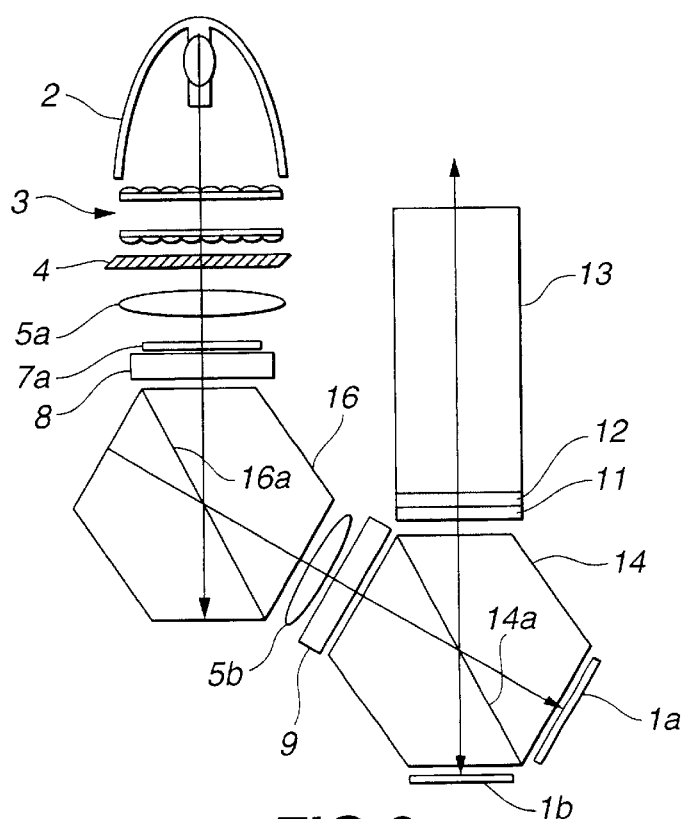
FIG. 9 is a side view showing an image projection device of the present invention formed by a polarizing beam splitter of a hexagonal prismatic shape in place of the polarizing filter.

The image projection apparatus of the present invention may be arranged by providing the cubic polarizing beam splitter 15 or the polarizing beam splitter 16 in the form of the hex prism as a polarization selecting device in place of the second polarization plate 7b, arranged at back of the color switching element 8 in each of the above-described embodiments, as shown in FIGS. 8 and 9. The function of these polarizing beam splitters 15, 16 is to detect the polarization state converted by the operation of the color switching element 8, that is to permit transmission only of the light beam in a pre-set polarization direction.

In the image projection apparatus shown in FIG. 8, only the light beam transmitted through the reflecting surface 15*a* of the polarizing beam splitter 15 is routed through the color separation element 9 and the liquid crystal panels 1*a*, 1*b* to the projection lens 13, whereas, in the image projection apparatus shown in FIG. 9, only the light beam reflected by the reflecting surface 16*a* of the polarizing beam splitter 16 is routed to the projection lens 13 through the color separation element 9 and the liquid crystal panels 1*a*, 1*b*.

Figure 10:
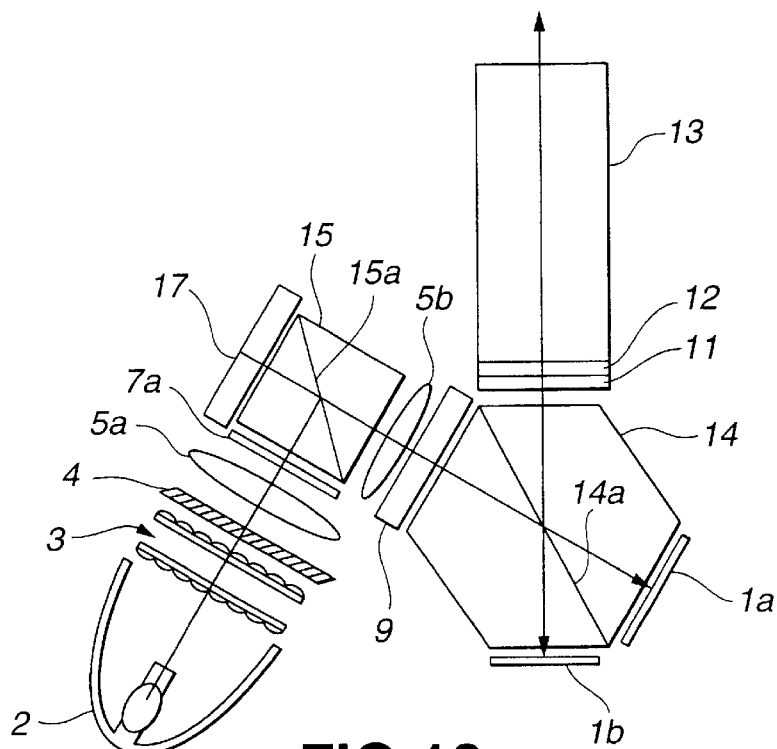
FIG. 10 is a side view showing a configuration of an image projection apparatus according to the present invention formed by using a reflection type color switching element.
Figure 11:
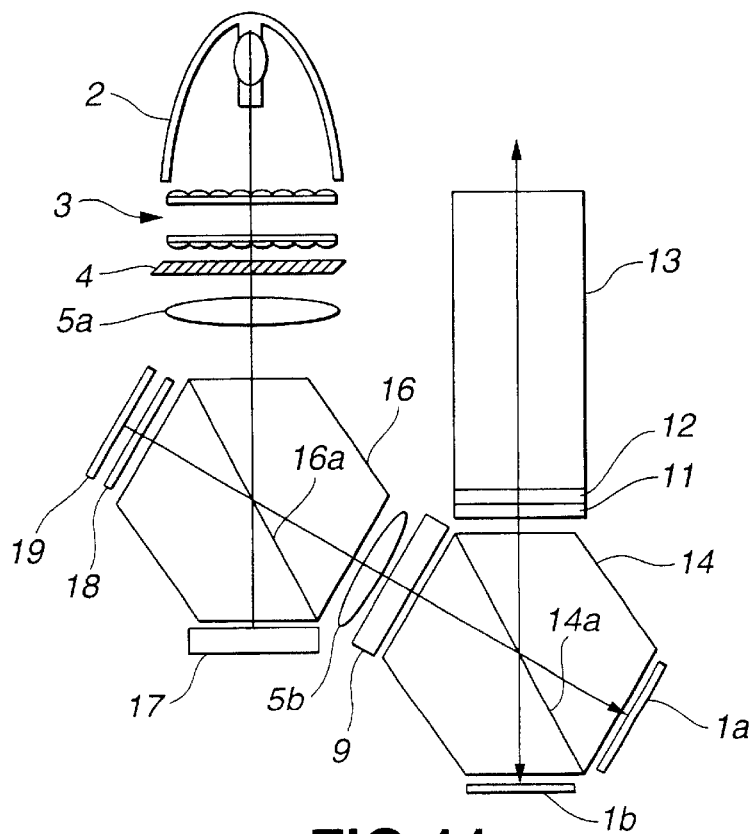
FIG. 11 is a side view showing a configuration of an image projection apparatus according to the present invention formed by using a reflection type color switching element and a polarizing beam splitter of a hexagonal prismatic shape.

The image projection apparatus of the present invention may also be constructed using a reflection type color separation element 17, as shown in FIGS. 10 and 11. This color separation element 17 has the function of providing for the polarization state of one of the prime color components of the incident light beam which is different from the polarization state of the remaining two prime color components, in reflecting the light beams, and sequentially switching the one prime color component with lapse of time. It is therefore possible to permit the reflected light beam from this color separation element 17 to be transmitted through the polarization plate or the polarizing beam splitter to eliminate one of the three prime color components of the incident light beam on the color separation element 17 to leave the remaining two prime color components, as well as to switch the one prime color component sequentially with lapse of time.

In the image projection apparatus shown in FIG. 10, the light beam radiated from the light source 2 is incident on the polarizing beam splitter 15 through the integrator 3, polarized light conversion system 4, first condenser lens 5*a* and a first polarizing plate 7*a* to the polarizing beam splitter 15. The incident light beam on the polarizing beam splitter 15 is S-polarized light, with respect to the reflecting surface 15*a*, by the operation of the polarized light conversion system 4 and the first polarizing plate 7*a*, and is reflected by the reflecting surface 15*a* so as to be radiated from the polarizing beam splitter 15 to reach the color switching element 17. The reflected light beam from the color switching element 17 has its direction of polarization deflected by 90° to be re-incident on the polarizing beam splitter 15. Since the re-incident light beam is P-polarized with respect to the reflecting surface 15*a*, it is transmitted through the reflecting surface 15*a* to exit from the polarizing beam splitter 15 to be re-incident on the color separation element 9 through the second condenser lens 5*b*. This light beam is transmitted by an optical system similar to the optical system in the above-described embodiment to reach the projection lens 13.

In an image projection apparatus, shown in FIG. 11, the light beam radiated from the light source 2 is transmitted through the integrator 3, polarized light conversion system 4 and the first condenser lens 5*a* to reach the polarizing beam splitter 16. By the operation of the polarized light conversion system 4, the incident light beam to the polarizing beam splitter 15 is P-polarized with respect to the reflecting surface 16*a*, and is transmitted through this reflecting surface 15*a* to exit from the polarizing beam splitter 16 to reach the color switching element 17. The reflected light beam of the color switching element 17 has its direction of polarization deflected by 90° and is re-incident on the polarizing beam splitter 16. Since the re-incident light beam is S-polarized with respect to the reflecting surface 16*a*, it is reflected by the reflecting surface 16*a* to exit from the polarizing beam splitter 16 to reach a reflecting plate 19 through a quarter wave plate ($\lambda/4$ plate) 16. The reflected light beam from the reflecting plate 19 is again transmitted through the quarter wave plate 18 and is P-polarized with respect to the reflecting surface 16*a*. The P-polarized light beam then is re-incident on the polarizing beam splitter 16 and transmitted through the reflecting plate 16*a* to exit from the polarizing beam splitter 16. The outgoing light beam from the polarizing beam splitter 16 is transmitted through the second condenser lens 5*b* to fall on the color separation element 9. This light beam is transmitted through an optical system similar to the optical system of the above-described embodiment to get to the projection lens 13.

In the image projection apparatus according to the present invention, a color wheel 20 may be used as temporal color separation means, as shown in FIGS. 12 to 15. This color wheel 20 includes a first filter for interrupting the first prime color component of the incident light and for permitting the second and third prime color components to be transmitted therethrough and a second filter for interrupting the second prime color component of the incident light and for permitting the first and third prime color components to be transmitted therethrough. These filters are sequentially positioned on the light path as time elapses to switch the one prime color component as time elapses. The first and second filters are mounted on a rotatably supported disc-shaped member. In the color wheel 20, the disc-shaped member is run in rotation to sequentially put the first and second first and second filters on the light path as time elapses.

Figure 12:
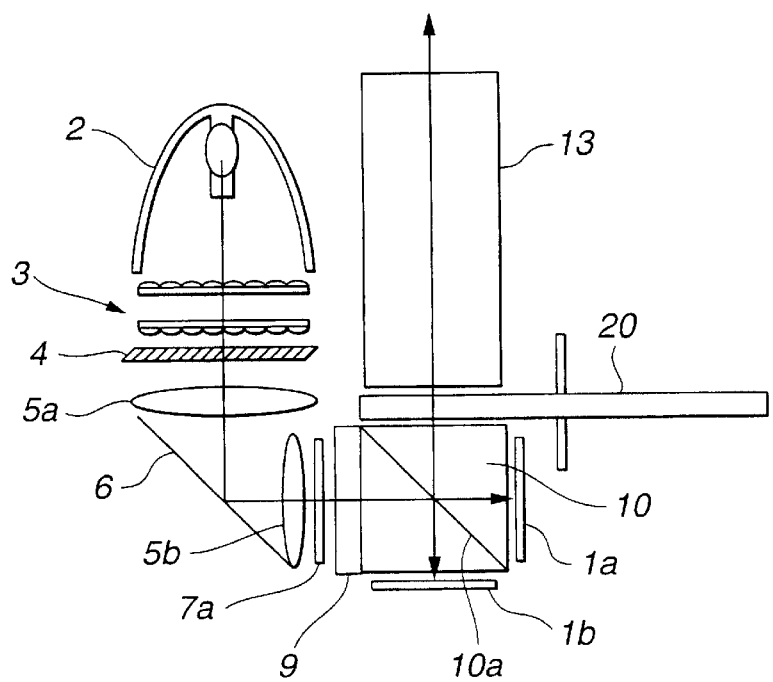
FIG. 12 is a side view showing a configuration of an image projection apparatus according to the present invention formed by using a color wheel as a color switching element.

In the image projection apparatus shown in FIG. 12, the light beam radiated from the light source 2 is transmitted through the integrator 3, polarized light conversion system 4, first condenser lens 5*a*, mirror 6, second condenser lens 5*b* and the first polarizing plate 7*a* to the color separation element 9 and thence to the cubically-shaped polarizing beam splitter 10.

The color separation element 9 and the polarizing beam splitter 10 are designed so that only the third prime color component becomes an S-polarized light with respect to the reflecting surface 10*a* of the polarizing beam splitter 10 so as to be reflected by this reflecting surface 10*a*. Then, in the incident light beam to the polarizing beam splitter 10, the first and second prime color components are transmitted through the reflecting surface 10*a* to reach the first liquid crystal panel 1*a*, whilst only the third prime color component is reflected by the reflecting surface 10*a* to reach the second liquid crystal panel 1*b*. In this case, the first liquid crystal panel la displays an image corresponding to the second prime color component, during the first time period, to modulate and reflect the incident light in keeping with the displayed image, while displaying an image corresponding to the first prime color component, during the second time period, to modulate and reflect the incident light in keeping with the displayed image. The second liquid crystal panel 1*b* is adapted for displaying an image corresponding to the third prime color component, during the first and second time periods, to modulate and reflect the incident light in keeping with this displayed image.

The light beams, reflected by the first and second liquid crystal panels 1*a*, 1*b*, are made into the light beam having the directions of polarization perpendicular to the direction of light polarization of the incident light beams to the liquid crystal panels 1*a*, 1*b* to revert to the polarizing beam splitter 10. These light beams are then synthesized by the reflecting surface 10*a* of the polarizing beam splitter 10 to exit from the polarizing beam splitter 10 to fall on the color wheel 20.

The color wheel 20 locates the first filter on the optical path, during the first period, to transmit the second and third prime color components therethrough, while locating the second filter on the optical path, during the second time period, to transmit the first and third prime color components.

The light beam transmitted through the color wheel 20 is incident on projection means having a projection lens 13. The light beam radiated from the polarizing beam splitter 10 to pass through the color wheel 20 gives a light beam synthesized from the three prime color components on integration with respect to time. So, a color image is projected by the projection lens 13.

Figure 13:
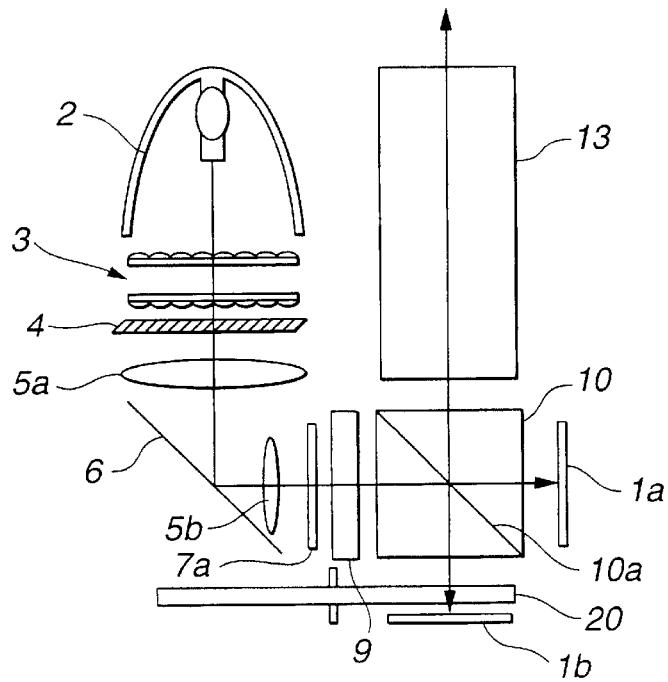
FIG. 13 is a side view showing a configuration of an image projection apparatus according to the present invention having a color wheel as a color switching element arranged between the polarizing beam splitter and the liquid crystal panel.

In the image projection apparatus, shown in FIG. 13, the light beam exiting from the light source 2 falls on the color separation element 9, through the integrator 3, polarized light conversion system 4, first condenser lens 5a, mirror 6, second condenser lens 5b and the first polarizing plate 7a, while also falling on the cubic-shaped polarizing beam splitter 10.

It is assumed that, in the color separation element 9 and the polarizing beam splitter 10, only the third prime color component prove P-polarized light with respect to the reflecting surface 10a of the polarizing beam splitter 10 so as to be transmitted through the reflecting surface 10a. Then, in the incident light beam on the polarizing beam splitter 10, the first and second prime color components are reflected by the reflecting surface 10a to proceed towards the second liquid crystal panel 1b, whilst only the third prime color component is transmitted through the reflecting surface 10a to reach the first liquid crystal panel 1a. In this case, the second liquid crystal panel 1b displays an image corresponding to the second prime color component, during the first time period, to modulate and reflect the incident light in keeping with this image, whereas, it displays an image corresponding to the second prime color component, whereas, during the second time period, it displays an image corresponding to the first prime color component to modulate and reflect the incident light in keeping with the displayed image. The first liquid crystal panel 1a is adapted for displaying an image in keeping with the third prime color component, during the first and second time periods, to modulate and reflect the incident light in keeping with the displayed image.

In this image projection apparatus, the color wheel is arranged between the polarizing beam splitter 10 and the second liquid crystal panel 1b. So, during the first time period, when the color wheel 20 causes the first filter to be positioned on the optical path to transmit the second and third prime color components, only the second one of the first and second prime color components, reflected by the first reflecting surface 10a to proceed towards the second liquid crystal panel 1b, reaches the second liquid crystal panel 1b, whereas, during the second time period, when the color wheel 20 causes the second filter to be positioned on the optical path to transmit the first and third prime color components, only the first prime color component reaches the second liquid crystal panel 1b.

The light beam, reflected by the first and second liquid crystal panels 1a, 1b, are polarized in a direction perpendicular to the direction of polarization of the incident light beams to the liquid crystal panels 1a, 1b, to return to the polarizing beam splitter 10, so as to be synthesized on the reflecting surface 10a of the polarizing beam splitter 10 to exit from the polarizing beam splitter 10 fall on the projection lens 13 (projection means). The light beam radiated from the polarizing beam splitter 10 on integration with respect to time gives a synthesis of three prime color components so that a color image is projected by the projection lens 13.

Figure 14:
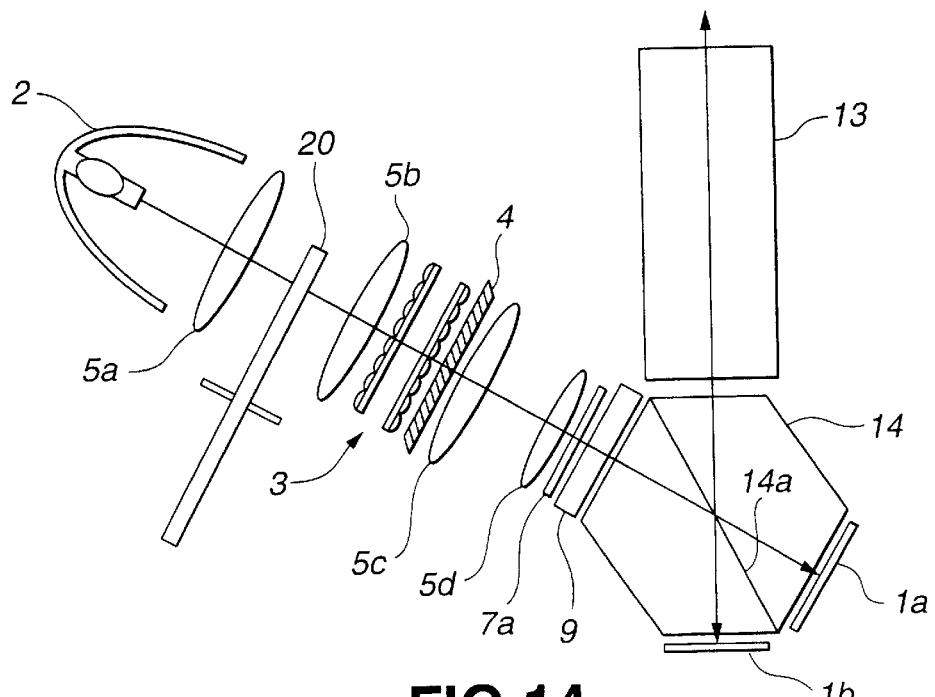
FIG. 14 is a side view showing a configuration of an image projection apparatus of the present invention having a color wheel as a color switching element arranged directly at back of a light source.

In the image projection apparatus, shown in FIG. 14, the light beam radiated from the light source 2 falls on the color wheel 20 through the first condenser lens 5a. The light beam through the color wheel 20 falls on the color separation element 9 through the second condenser lens 5c, integrator 3, polarized light conversion system 4, third condenser lens 5c, fourth condenser lens 5d and the first polarizing plate 7a, while also falling on a hexagonal prismatic polarizing beam splitter 14.

The color wheel 20 is designed so that it causes a first filter to be located on the optical path during the first period to permit second and third prime color components to be transmitted therethrough, while causing a second filter to be located on the optical path during the second period to permit first and third prime color components to be transmitted therethrough. The color separation element 9 and the polarizing beam splitter 14 are designed so that only the third prime color component proves S-polarized light with respect to a reflecting surface 14a of the polarizing beam splitter 14 so as to be reflected by this reflecting surface 14a.

During the first period, the second and third prime color components are incident on the polarizing beam splitter 14, with the second prime color component passing through the reflecting surface 14a to reach the first liquid crystal panel 1a and with the third prime color component reaching the second liquid crystal panel 1b after reflection on the reflecting surface 14a. During the second period, the first and third prime color components are incident on the polarizing beam splitter 14, with the first prime color component passing through the reflecting surface 14a to reach the first liquid crystal panel 1a and with the third prime color component reaching the second liquid crystal panel 1b after reflection on the reflecting surface 14a.

In this case, the first liquid crystal panel 1a is adapted to display an image corresponding to the second prime color component during the first period to modulate and reflect the incident light depending on this image, and to display an image corresponding to the first prime color component during the second period to modulate and reflect the incident light depending on this image. The second liquid crystal panel 1b is adapted to display an image corresponding to the third prime color component during the first and second periods to modulate and reflect the incident light depending on this image.

The light beams reflected back form the first and second liquid crystal panels 1a, 1b are polarized in a direction perpendicular to the light polarization direction of the incident light beams to the liquid crystal panels 1a, 1b to return to the polarizing beam splitter 14. The light beams then are synthesized on the reflecting surface 14a of the polarizing beam splitter 14 to exit from the polarizing beam splitter 14 to fall on projection means constituted by the projection lens 13.

The light beam radiated from the polarizing beam splitter 14 to fall on the projection lens 13 on integration with respect to time gives a light beam synthesized from the three prime color components. So, a color image is projected by the projection lens 13.

Figure 15:
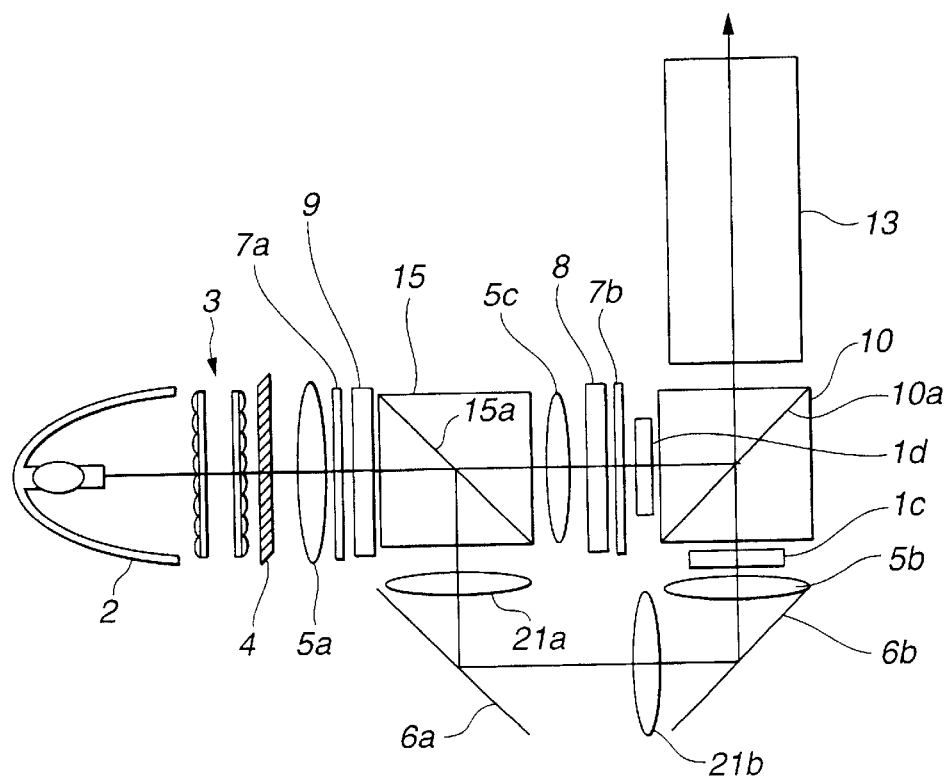
FIG. 15 is a perspective view showing the function of a color separation element and a color synthesis element in an image projection apparatus according to the present invention.

In the image projection apparatus, shown in FIG. 15, a transmission type liquid crystal panel is used as a spatial modulation element. In this image projection apparatus, the light beam radiated from the light source 2 is incident on the color separation element 9, via the integrator 3, polarized light conversion system 4, first condenser lens 5a and the first polarizing plate 7a, while also being incident on a cubic polarizing beam splitter 15.

The color separation element 9 and the polarizing beam splitter 15 are designed so that only the third prime color component proves S-polarized light with respect to a reflecting surface 15a of the polarizing beam splitter 15. The light beam of the third prime color component, reflected by the reflecting surface 15a of the polarizing beam splitter 15, is incident on a first liquid crystal panel 1c through a first relay lens 21a, a first mirror 6a, a second relay lens 21b, a second mirror 6b and a second condenser lens 5b. On the other hand, the light beams of the first and second prime color components, transmitted through the reflecting surface 15a of the polarizing beam splitter 15, is incident on a second liquid crystal panel 1d through a third condenser lens 5c, the color switching element 8 and the second polarizing plate 7b. The light beam transmitted through the first and second liquid crystal panels 1c, 1d fall on the polarizing beam splitter 10 responsible for light beam synthesis from two directions.

The light beams, transmitted through the first and second liquid crystal panels 1c, 1d, are synthesized on the reflecting surface 10a of the polarizing beam splitter 10 and radiated from the polarizing beam splitter 10 to fall on the projection lens 13 (projection means).

The color switching element 8 is designed so that, during the first period, the second prime color component is made into S-polarized light with respect to the reflecting surface 10a of the polarizing beam splitter 10 and, during the second period, the first prime color component is made into the S-polarized light with respect to the reflecting surface 10a of the polarizing beam splitter 10a.

During the first period, the second prime color component transmitted through the second liquid crystal panel 1d is incident on the polarizing beam splitter 10, whereas, during the second period, the first prime color component transmitted through the second liquid crystal panel 1d is incident on the polarizing beam splitter 10. During the first and second periods, the third prime color component transmitted through the first liquid crystal panel 1c is incident on the polarizing beam splitter 10.

During the first period, the second liquid crystal panel 1d is adapted to display an image corresponding to the second prime color component to modulate and transmit the incident light depending on this image. During the second period, the second liquid crystal panel 1d is adapted to display an image corresponding to the first prime color component to modulate and transmit the incident light depending on this image. During the first and second periods, the first liquid crystal panel 1c is adapted to display an image corresponding to the third prime color component, to modulate and transmit the incident light depending on this image.

The light beam radiated from the polarizing beam splitter 14 to fall on the projection lens 13 on integration with respect to time gives a light beam synthesized from the three prime color components. So, a color image is projected by the projection lens 13.

The first and second filters in the color wheel in the above-described embodiment may be those which absorb the first prime color component and reflect the second and third prime color components in the incident light, and those which absorb the second prime color component and reflect the first and third prime color components in the incident light, respectively. That is, the color wheel may be provided with a rotatable disc-shaped member colored to prime colors desired to be reflected.

In the above-described respective embodiments, the polarization plate through which the incident light beam is transmitted to travel towards each color separation element 9 is used for the purpose of permitting the linearly polarized light beam with good polarization degree to fall on the color separation element 9. By improving the polarization degree of the light beam incident on the color separation element 9, it is possible to optimize color separation characteristics. If color separation characteristics in the color separation element 9 are good, optimum separation characteristics into P- and S-polarized light in the polarizing beam splitter and the function of a color synthesis device is not necessarily required.

Embodiment

Figure 5:
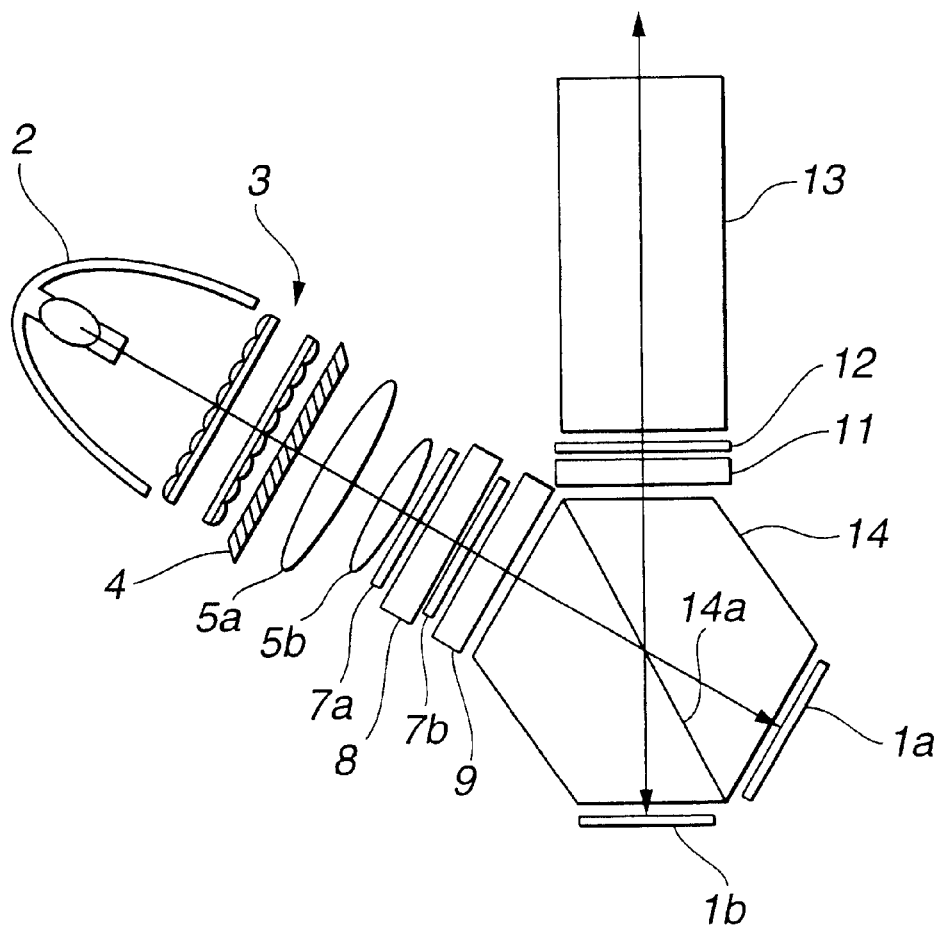
FIG. 5 is a side view showing the image projection apparatus constructed using a polarizing beam splitter of a hexagonal prismatic shape.

Various examples of color combinations of the color separation device and the color switching device in the image projection apparatus according to the present invention are hereinafter explained. First, the image projection apparatus shown in FIGS. 3 and 5 is explained.

First Embodiment

A color separation device is used for separation into red (R) and cyan (C), whilst a color switching device is used for separation into magenta (M) and yellow (Y).

Figure 16:
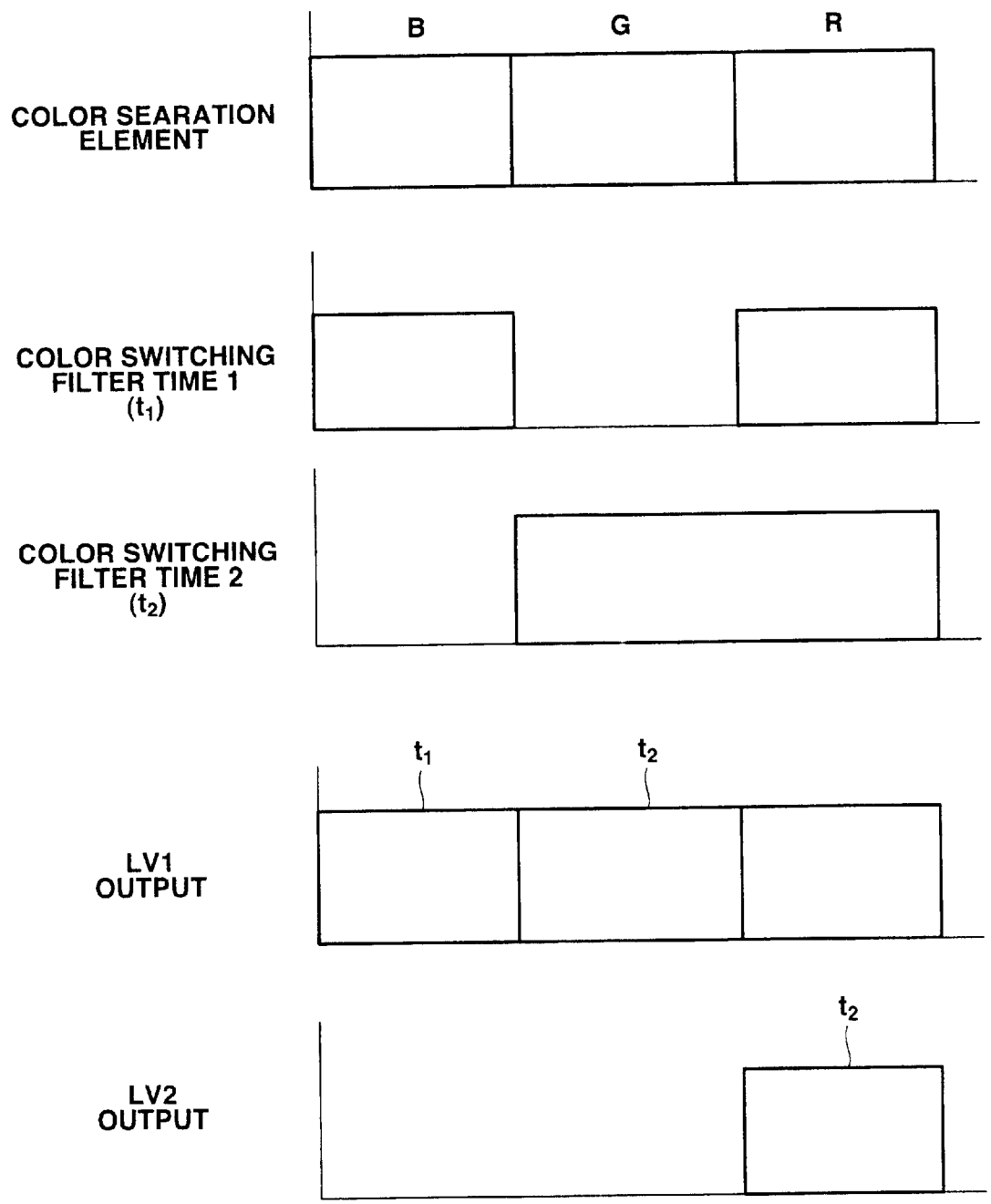
FIG. 16 is a graph showing the operation of a color switching element in an image projection apparatus according to the present invention.

Referring to FIG. 16, the color separation device separates the prime color components into red and cyan components, whilst the color switching device separates the prime color components into magenta and yellow components temporally. If the direction of polarization of the cyan components is the direction of polarization with respect to the reflecting surface of the polarizing beam splitter, the cyan component is reflected by the reflecting surface to fall on the first liquid crystal panel LV1, whilst the red component is transmitted through the reflecting surface to fall on the second liquid crystal panel LV2.

The second liquid crystal panel LV2 is responsible for modulation of the red component, whilst the color switching device is responsible for modulation of blue and green light components. That is, the color switching device is a filter for magenta components at a time point when the second liquid crystal panel LV2 is modulating the blue component, while being a filter for the yellow component when the second liquid crystal panel LV2 is modulating the blue component. The first liquid crystal panel LV1 is responsible for modulating the red component at any time point. This accounts for the reason color switching of magenta (=blue+red) and yellow (=green+red) is necessary with the color switching device.

The above enables reproduction of three prime colors by the combination of the color separating device and the color switching device. Meanwhile, if the polarization direction of cyan separated by the color separating device is the P-polarization direction with respect to the reflecting plate of the polarizing beam splitter, it is sufficient if the arrangement of the first and second liquid crystal panels LV1, LV2 is reversed.

Second Embodiment

A color separation device is responsible for separation into blue (B) and yellow (Y), whilst a color switching device is responsible for separation into cyan (C) and magenta (M).

In this case, the first liquid crystal panel LV1 modulates the blue component, whilst the color switching device switches between cyan (C) and magenta (M).

Third Embodiment

A color separation device is responsible for separation into green (G) and magenta (M), whilst a color switching device is responsible for separation into cyan (C) and yellow (Y).

In this case, the first liquid crystal panel LV1 modulates the green component, whilst the second liquid crystal panel LV2 modulates blue and red components.

Fourth Embodiment

In the following three embodiments, both the first liquid crystal panel LV1 and the second liquid crystal panel LV2 modulate the two prime color components.

Figure 17:
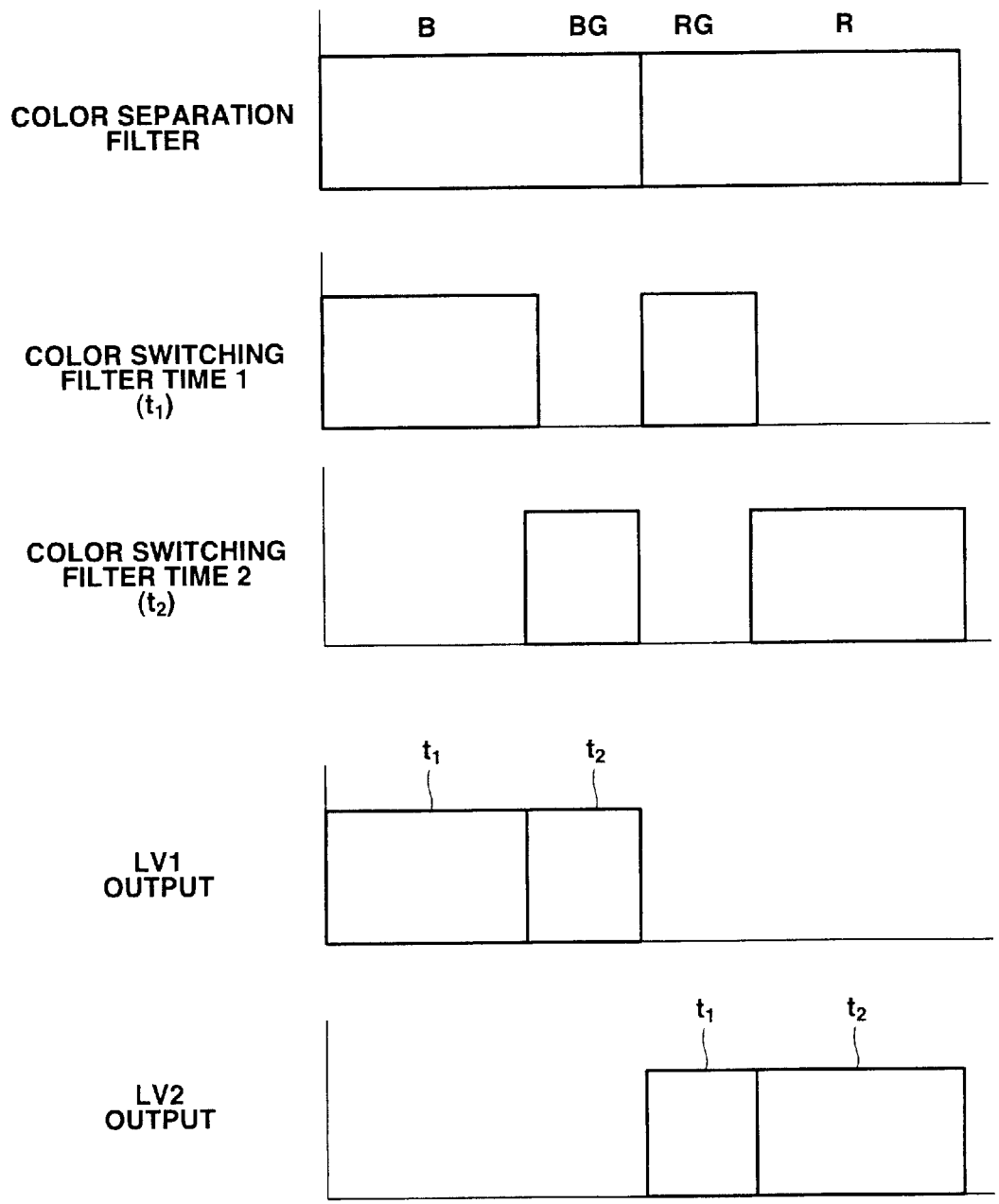
FIG. 17 is a graph showing an operation of a typical color switching element in an image projection apparatus according to the present invention.

Referring to FIG. 17, the color separating device separates the prime color components into blue (B) and bluish green (BG; green 1) and into red (R)+reddish green (RG: green 2), whilst the color switching device switches between cyan and yellow. The first liquid crystal panel LV1 modulates the blue and bluish green components, whilst the second liquid crystal panel LV2 modulates the red and reddish green components.

Fifth Embodiment

Figure 18:
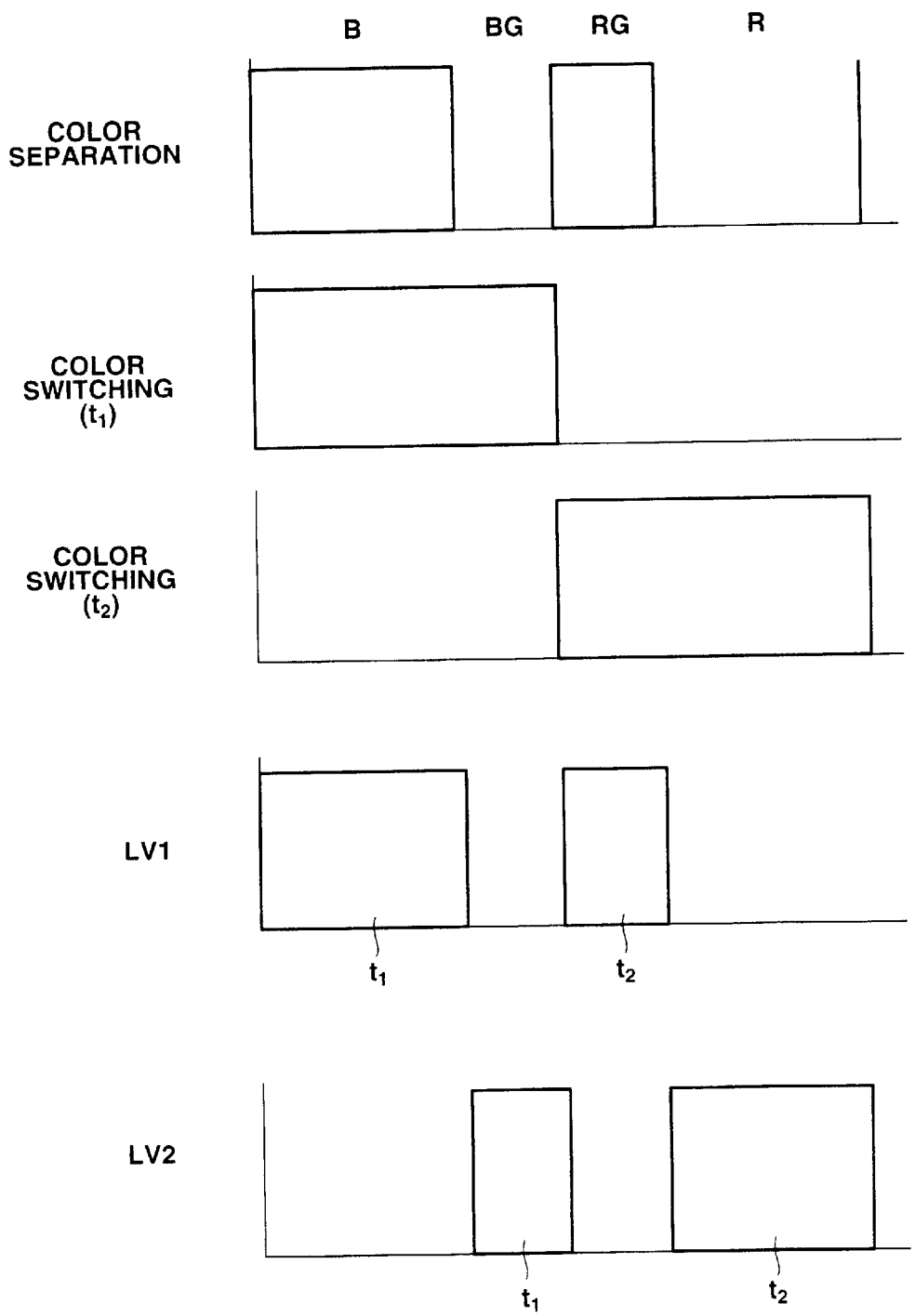
FIG. 18 is a graph showing an operation of another typical color switching element in an image projection apparatus according to the present invention.

Referring to FIG. 18, the color separating device separates the prime color components into blue (B) and bluish green (RG; green 2) and into red (R)+bluish green (BG: green 1), whilst the color switching device switches between red (R) and reddish green (BG). The first liquid crystal panel LV1 modulates the blue and reddish green components, whilst the second liquid crystal panel LV2 modulates the red and bluish green components.

Which of the above filter designing embodiments is to be adopted is determined based on the combinations thereof with light emission characteristics of the light source. If, in a light source red color rendition, blue color rendition or green color rendition is bad, the construction of the first, second or third Embodiment 1, 2 or 3 is desirable, respectively, whereas, if the color balance of the light source is good, the construction of the fourth Embodiment is desirable.

Sixth Embodiment

The color separating device separates the prime color components into red (R) and cyan (C), whilst the color switching device switches between yellow (Y) and white (W).

In this case, the first liquid crystal panel LV1 modulates the red and white components, whilst the second liquid crystal panel LV2 modulates the blue, green and white components.

A difference of the present Embodiment from the first Embodiment is that temporal color switching is for three colors. This structure has merits that white luminosity may be improved by adding white, and that the problem of [color breakup] in moving picture representation as later explained can be mitigated.

As for color combination, white can be added to the color switching in the above-mentioned second to fifth Embodiments.

An illustrative designing of the color separating device is now explained for the first Embodiment described above.

Figure 19:
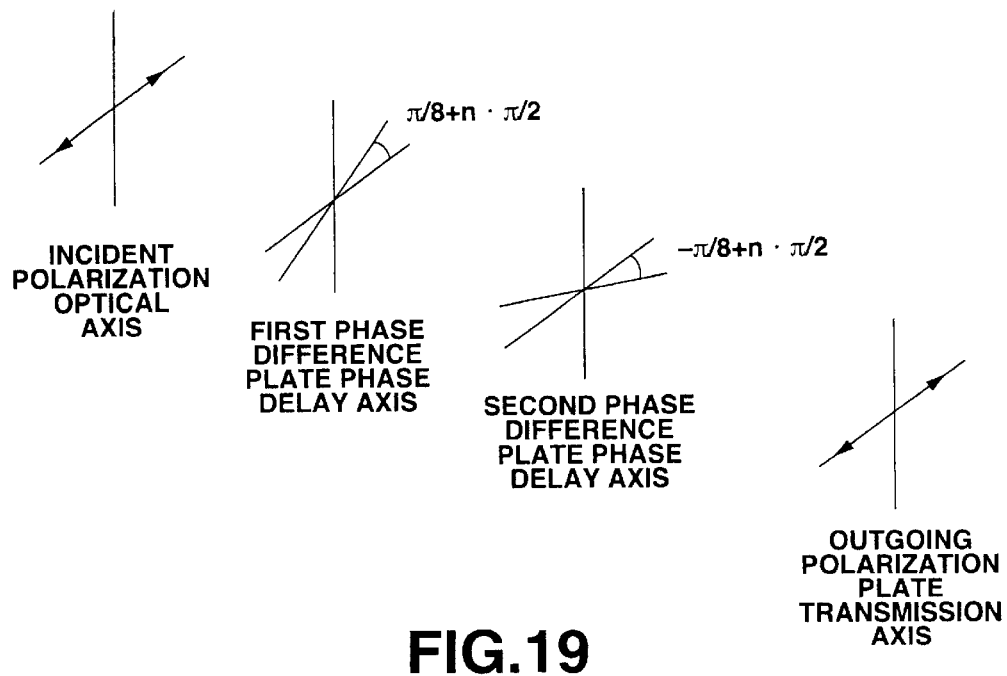
FIG. 19 is a perspective view showing a configuration of a typical designing of a color switching element.
Figure 20:
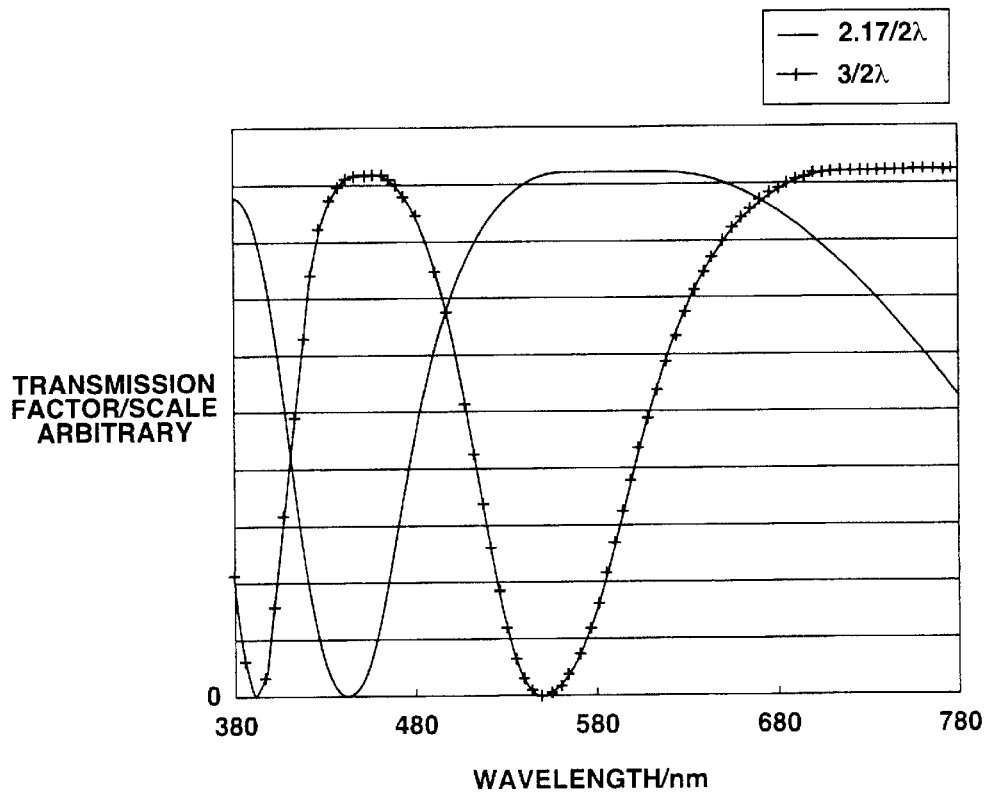
FIG. 20 is a graph showing a spectrographic transmission factor of a polarizing plate shown in FIG. 19.
Figure 21:
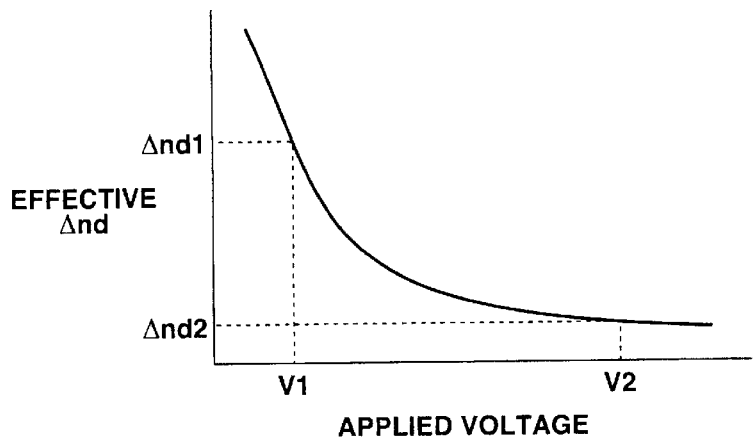
FIG. 21 is a graph showing characteristics of a liquid crystal cell in a designing example 1 of the color switching element.
Figure 22:
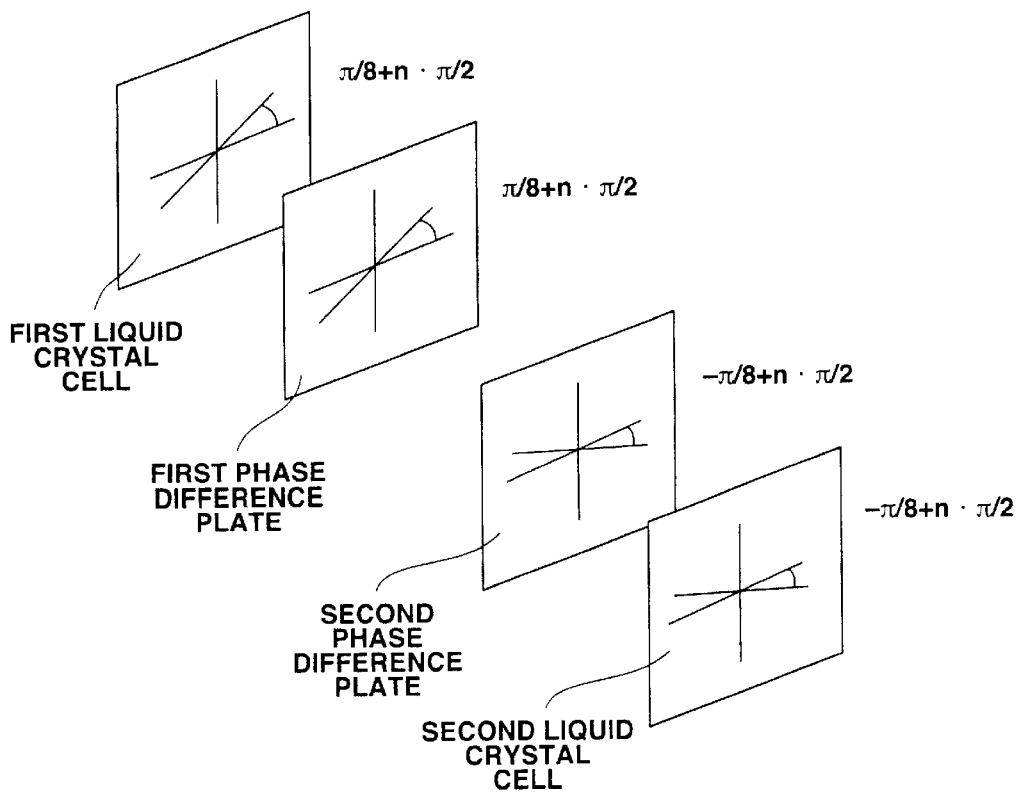
FIG. 22 is a perspective view showing a configuration of the designing example 1 of the color switching element.

A color filter can be designed by the combination of a phase different plate and a polarization plate. FIG. 19 shows a configuration of employing two phase difference plates. The phase delay axis of each phase different plate is of the following two values, as shown in FIG. 19:

$\{(\pi/8)+n\}\cdot(\pi/2)$, where n is an integer $\{(\pi/8)+n\}\cdot(\pi/2)$, where n is an integer This is based on the theory of a folded Solc filter. With the material of the phase difference plate being polycarbonate and with $\Delta nd$ (where $\Delta n$ is the refractive index anisotropy and d is thickness), referred to below as $\Delta nd$, being varied, the spectroscopic transmission factor after transmission through the polarization plate is as shown in FIG. 20. The phase difference values of the two phase difference plates are equal to each other. FIG. 20 shows the transmission factor with retardation at wavelength of 550 nm being $3\lambda/2$ and $2.17\lambda/2$. These phase difference plates are filters of magenta and yellow components.

In an image projection apparatus of the so-called "three-plate structure" in which modulation devices are arranged for three colors of red, green and blue (RGB), the sum total of the transmission factors of the tri-color separation filter is 100% or less. However, if time division switching is used, the sum total of characteristics of respective filter characteristics can be 100% or higher.

In FIG. 19, the characteristics of respective transmission factors of the blue and green components overlap with each other at switching portions between these components. That is, there is a wavelength range or which the transmission factor exceeds 100%, as when the transmission factors of the magenta and yellow components are summed together. With this filter designing, it is possible to improve luminosity of the projected image.

First Designing Embodiment

The retardation variations of the magenta and yellow components are 228 nm by the following equation:

(550 nm/2)·(3−2.17)=228 nm.

This phase difference switching is realized using a liquid crystal cell. As an example, the case of employing "bent orientation cell" is explained. By properly setting $\Delta n$ of the liquid crystal material, cell gap d and the switching voltages V1 and V2, designing can be made so as to give the desired retardation variation.

This is combined with a phase difference plate by a stretched polycarbonate film in the sequence of a first liquid crystal cell, a first phase difference plate, a second liquid crystal cell and a second phase difference plate so that the sum of the retardation for the liquid crystal driving voltage V1 and the retardation for the phase difference plate is (550 nm/2)·3=825 nm.

The phase delay axis of the first liquid crystal cell and that of the first phase difference plate are of the following values:

$\{(\pi/8)+n\}\cdot(\pi/2)$ where n is an integer.

The phase delay axis of the second liquid crystal cell and that of the second phase difference plate are of the following values:

$\{(-\pi/8)+n\}\cdot(\pi/2)$ where n is an integer.

It is possible to interchange the sequence of the first liquid crystal cell and the first phase difference plate and that of the second liquid crystal cell and the second phase difference plate. As the liquid crystal mode, such operating modes as the VA (vertical orientation mode) or HAN (hybrid orientation) may be used. These modes are both well-known modes. Although there are two liquid crystal cells, the respective liquid crystal cells can be driven by a sole driving circuit, by connecting the respective liquid crystal cells in parallel with a sole driving circuit, because the driving conditions for the two liquid crystal cells are the same.

Second Designing Embodiment

Figure 23:
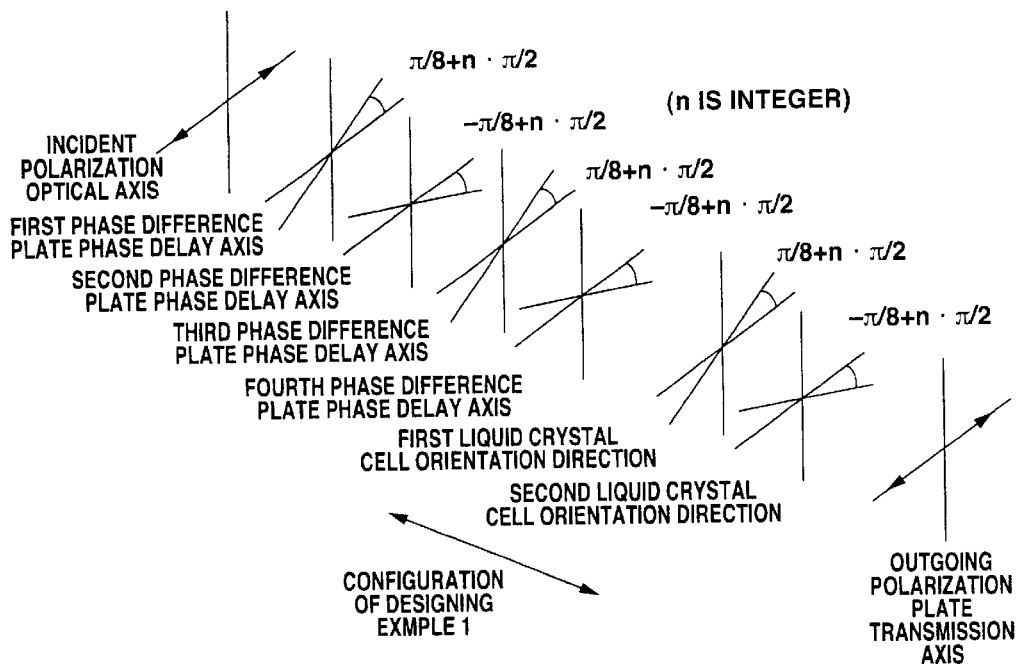
FIG. 23 is a perspective view showing a configuration of another designing example 2 of the color switching element.

Filter characteristics can be adjusted by combining the structure of the first designing embodiment with a phase difference plate layered thereon. That is, the first to fourth phase difference plates, first liquid crystal cell and the second liquid crystal cell are sequentially combined and layered together, as shown in FIG. 23.

The first to fourth phase plates are respectively of the following values:

$\{(\pi/8)+n\}\cdot(\pi/2)$, $\{(-\pi/8)+n\}\cdot(\pi/2)$,

{(π/8)+n}·(π/2), and

{(−π/8)+n}·(π/2), where n is an integer.

The phase delay axis of the first liquid crystal cell is of the value of {(π/8)+n}·(π/2), where n is an integer, whilst the delay axis of the second liquid crystal cell is of the value of {(−π/8)+n}·(π/2), where n is an integer.

Figure 24:
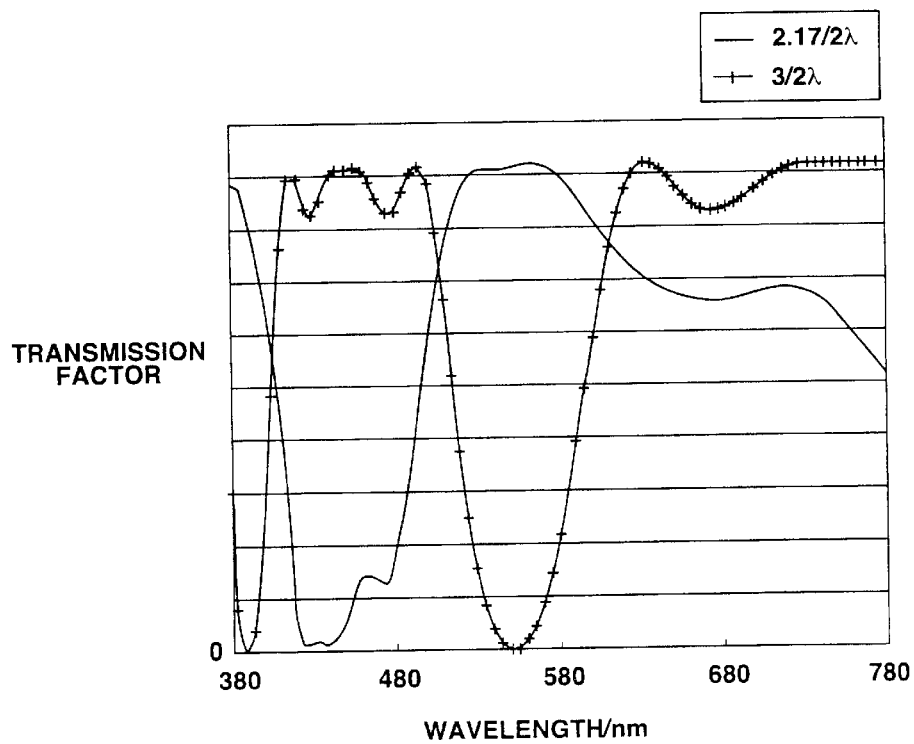
FIG. 24 is a graph showing a spectrographic transmission factor of the polarizing plate shown in FIG. 21.

The retardation of the phase difference plate is set to magenta (825 nm). That is, with the voltage of the liquid crystal cell being set to V1 and with the retardation set to 825 nm, three magenta filters are layered together. This structure improves the transmission factor of the blue wavelength range as compared to the case of the structure with a sole magenta filter layer. The spectrographic transmission factor in this structure is shown in FIG. 24.

Third Designing Embodiment

Figure 25:
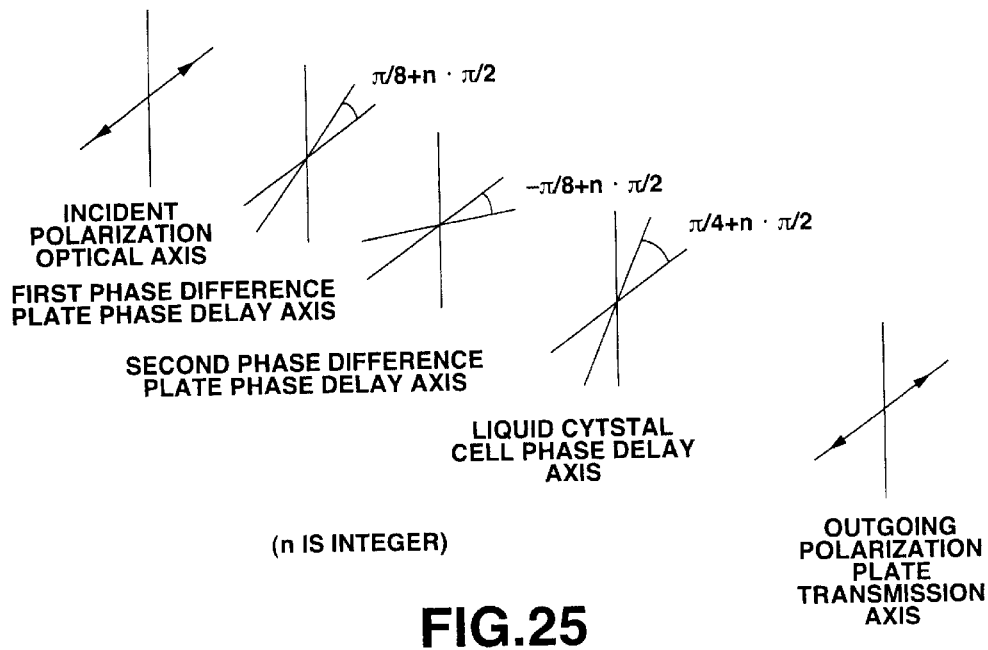
FIG. 25 is a perspective view showing a configuration of a designing example 3 of the color switching element.

Here, two phase difference plates of the first designing embodiment are prepared by the layering together of stretched films, and are combined with a sole liquid crystal cell so that the first and second phase difference plates and the liquid crystal cell are sequentially combined and layered as shown in FIG. 25. The angle of each phase delay axis then is set. The layered portion of the phase difference plate is designed to give yellow or magenta characteristics, as shown in FIG. 25, and the voltage of the liquid crystal cell is switched to change over to another color.

The phase delay axis of the first phase plate is set to {(π/8)+n}·(π/2), where n is an integer, whilst the phase delay axis of the first phase plate is set to {(−π/8)+n}·(π/2), where n is an integer.

The phase delay axis of the liquid crystal cell is set to {(π/4)+n}·(π/2), where n is an integer.

Figure 26:
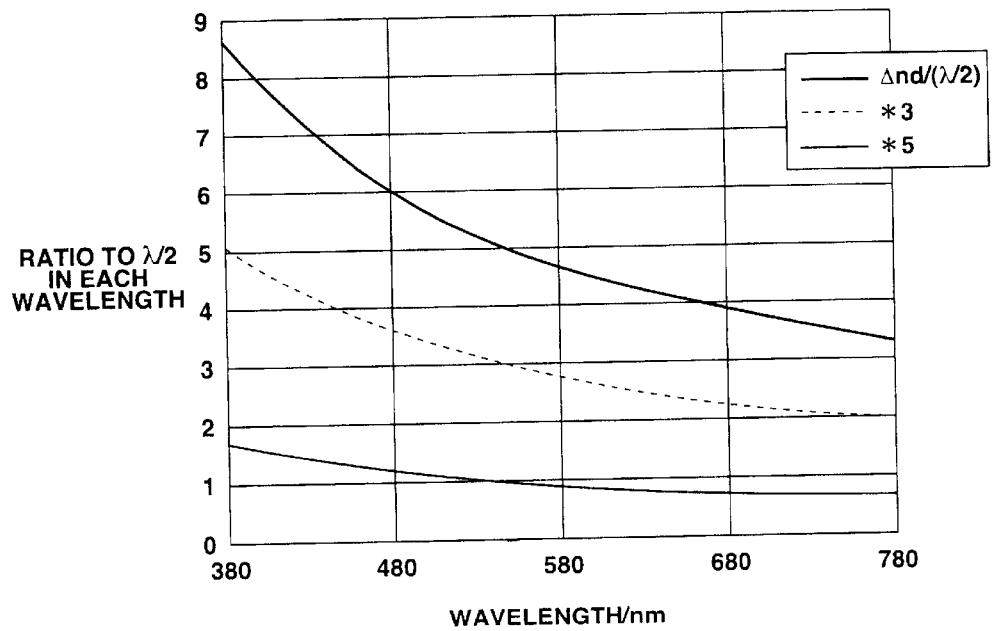
FIG. 26 is a graph showing the ratio of Δnd to λ/2 in each wavelength in the designing example 3.

For realizing the color switching device for magenta and yellow with a sole liquid crystal cell, it is ideal that the variation of retardation be equal to an odd number times λ/2 in green and blue and to an even number times λ/2 in red. The ratio of Δnd to λ/2 in each wavelength is shown in FIG. 26. Here, wavelength dispersion data of Δn of the routine liquid crystal material is used. In the legend of the graph of FIG. 26, *3 and *5 indicate the cases where Δnd in 550 nm is three times and five times λ/2 (225 nm), respectively.

Figure 27:
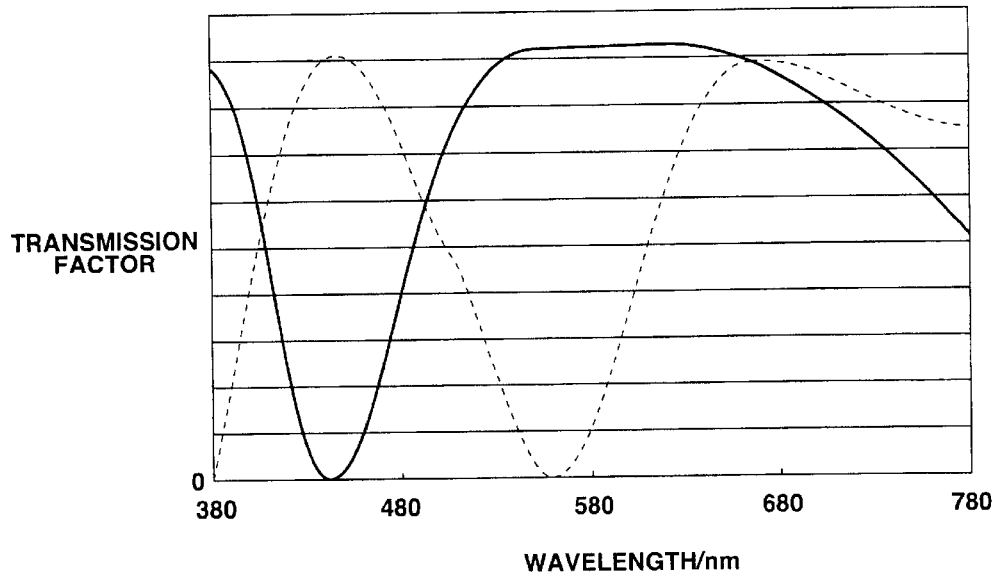
FIG. 27 is a graph showing the spectrographic transmission factor of the polarizing plate shown in FIG. 25.
Figure 28:
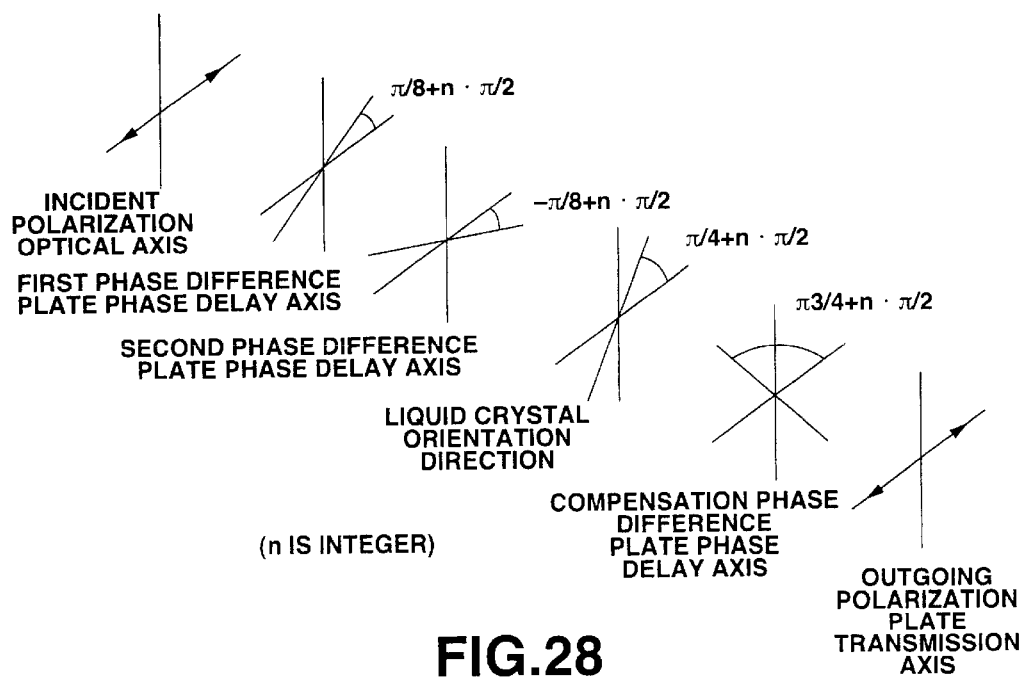
FIG. 28 is a perspective view showing the configuration of the designing example 3 plus a compensation phase plate.

The value of Δnd of 1375 nm, corresponding to five times λ/2 for 550 nm, is seven times λ/2 for 440 nm. The value of Δnd in the wavelength range of red is in the vicinity of four times λ/2, so that changes in the transmission factor is only small. A liquid crystal layer is combined to a layered product of the yellow phase difference plates. FIG. 27 shows the spectrographic transmission factor of the yellow color switching device.

As the liquid crystal mode, bend orientation, VA (vertical orientation mode) or HAN (hybrid orientation) may be used. It is noted that the low-level value of the effective Δnd obtained on voltage application needs to be set to 0. With bend orientation or HAN, a high voltage is required in order to set the effective Δnd to 0. For taking these measures, compensation may be made by arranging a static compensation phase difference plate, such as a stretched film, for extending in a direction perpendicular to the liquid crystal arraying direction.

That is, the first and second phase difference plates, liquid crystal cell and the compensation phase difference plate are layered in combination sequentially and the angles of the respective phase delay axes are set.

The first and second phase plates are respectively of the phase delay axes of {(π/8)+n}·(π/2) and {(−π/8)+n}·(π/2), where n is an integer.

The delay phase axis of the liquid crystal cell is set to {(π/4)+n}·(π/2), where n is an integer.

On the other hand, the delay phase axis of the compensation phase plate is set to {(3π/4)+n}·(π/2), where n is an integer.

Fourth Designing Embodiment

By splitting the liquid crystal cell in the above third designing embodiment into two layers, it is possible to switch between three colors of magenta, yellow and white. The direction of orientation of the liquid crystal cell is the same for the two cells. For the retardation of the liquid crystal cell or yellow retardation (596 nm), white is displayed. That is, the retardation of the two liquid crystal layers, voltage and the compensation phase plate are set so that the retardation will assume three values of 0, 596 nm and 1375 nm, respectively.

Fifth Designing Embodiment

Although the characteristics are similar to those of the first designing embodiment, it is possible to switch between the three colors of magenta, yellow and white with two plates. The difference of this fifth designing embodiment from the first designing embodiment is that switching between magenta and yellow and between yellow and white is made by the combination of the phase difference plate and between the yellow and white by the combination of the phase difference plate and the liquid crystal cell. By layering the phase difference plate and the liquid crystal cell, it is possible to switch between the three colors of magenta, yellow and white. Here, the orientation of the phase difference plate and that of the liquid crystal cell are set as shown in FIG. 27.

That is, the first phase difference plate, first liquid crystal cell and the second phase difference plate are combined together sequentially to form a phase difference plate set. The third phase difference plate, the second liquid crystal cell and the fourth phase plate are combined sequentially to form a second phase difference plate set, and respective angles of the phase delay axes are set.

The delay phase axis of the first phase plate is set to {(π/8)+n}·(π/2), where n is an integer.

The delay phase axis of the first liquid crystal cell is set to

{(π/2)+n}·(π/2), where n is an integer.

The delay phase axis of the second phase plate is set to {(−π/8)+n}·(π/2), where n is an integer.

The delay phase axis of the third phase plate is set to {(π/8)+n}·(π/2), where n is an integer.

The delay phase axis of the second liquid crystal cell is set to

{(π/2)+}·(π/2), where n is an integer.

The delay phase axis of the fourth phase plate is set to {(−π/8)+n}·(π/2), where n is an integer.

Figure 29:
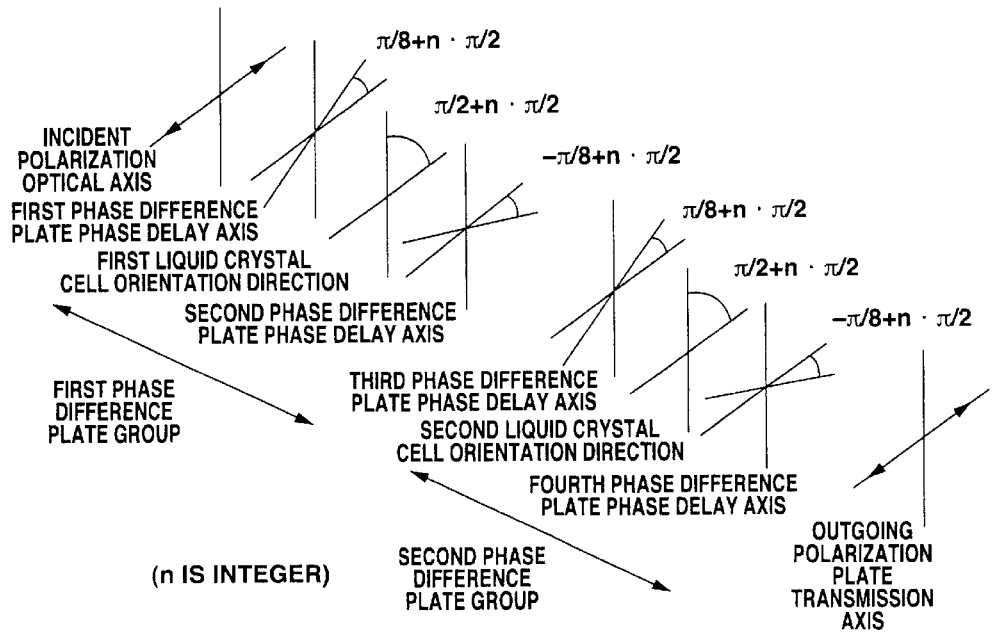
FIG. 29 is a perspective view showing a configuration of a designing example 5 of the color switching element.

The retardation for magenta and yellow is set as in the case of the first designing embodiment. By using the following combination, it is possible to switch between yellow, magenta and white. If, in FIG. 29, the first retardation phase difference plate set and the second retardation phase difference plate set are set to magenta (825 nm) and to yellow (596 nm), respectively, the operation of the liquid crystal cell is as follows:

If the first and second liquid crystal cells are on and off, respectively, an output is magenta.

If the first and second liquid crystal cells are off and on, respectively, an output is yellow.

If the first and second liquid crystal cells are both off, an output is white.

It is noted that on means setting the voltage so that the retardation of the liquid crystal cell will be zero, and that off means setting the voltage so that the retardation of the liquid crystal cell will be equal to the same state as the state of the respective phase difference plates.

Sixth Designing Embodiment

Figure 30:
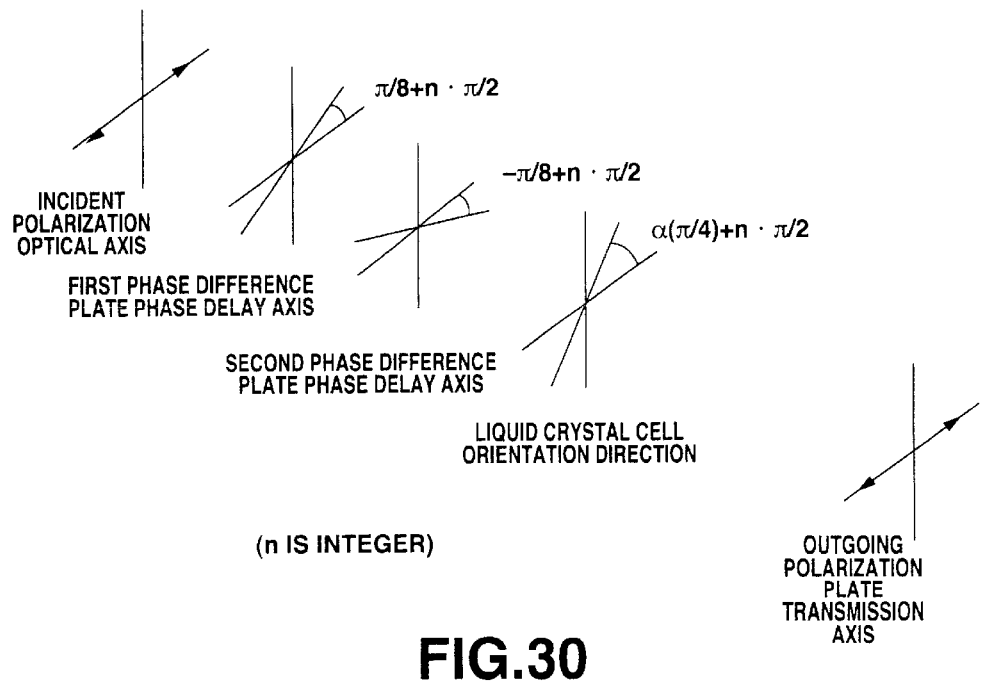
FIG. 30 is a perspective view showing a configuration of a designing example 6 of the color switching element.

A designing embodiment shown in FIG. 30 is directed to an instance of color switching between two colors of magenta and yellow employing a sole liquid crystal cell performing in-plane changeover switch employing a ferro-electric liquid crystal.

The first and second phase difference plates and the liquid crystal cell are layered sequentially and respective angles of the delay phase axes are set.

The delay phase axis of the first phase plate is set to $\{(\pi/8)+n\}\cdot(\pi/2)$, where n is an integer.

The delay phase axis of the second phase plate is set to $\{(-\pi/8)+n\}\cdot(\pi/2)$, where n is an integer.

The delay phase axis of the liquid crystal cell is set to $\{(\pi/4)+n\}\cdot(\pi/2)$, where n is an integer;

$n\cdot(\pi/2)$, where n is an integer.

Figure 31:
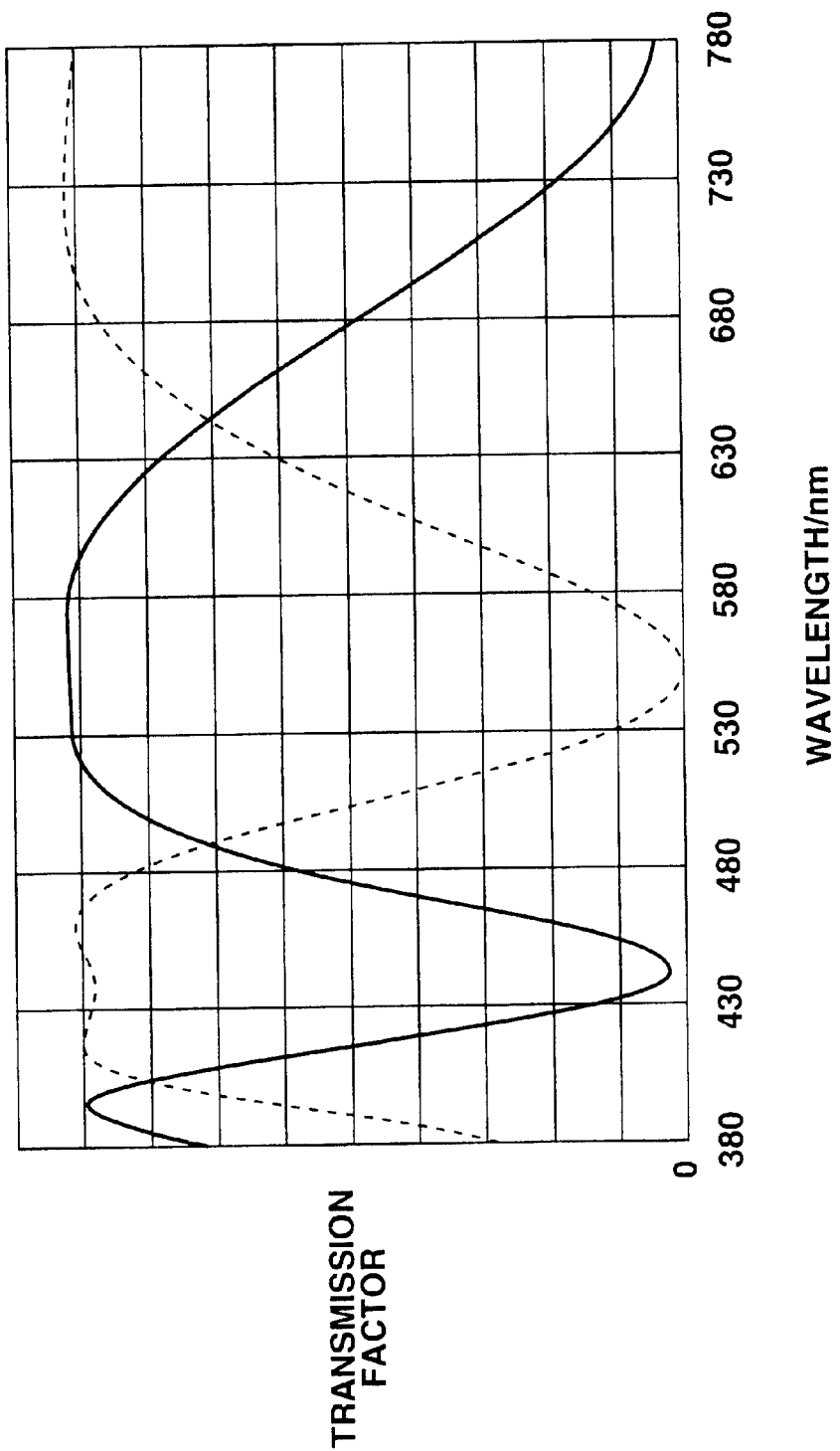
FIG. 31 is a graph showing the spectrographic transmission factor of the polarizing plate shown in FIG. 30.

The retardation of the phase difference plate is set to magenta, that is to 825 mm for a wavelength of 550 nm. The retardation of the liquid crystal cell is set to 188 nm for a wavelength of 550 nm. The azimuth of the liquid crystal orientation switches between 45° and 0°. The spectroscopic transmission factor at this time is shown in FIG. 31.

Seventh Designing Embodiment

Figure 32:
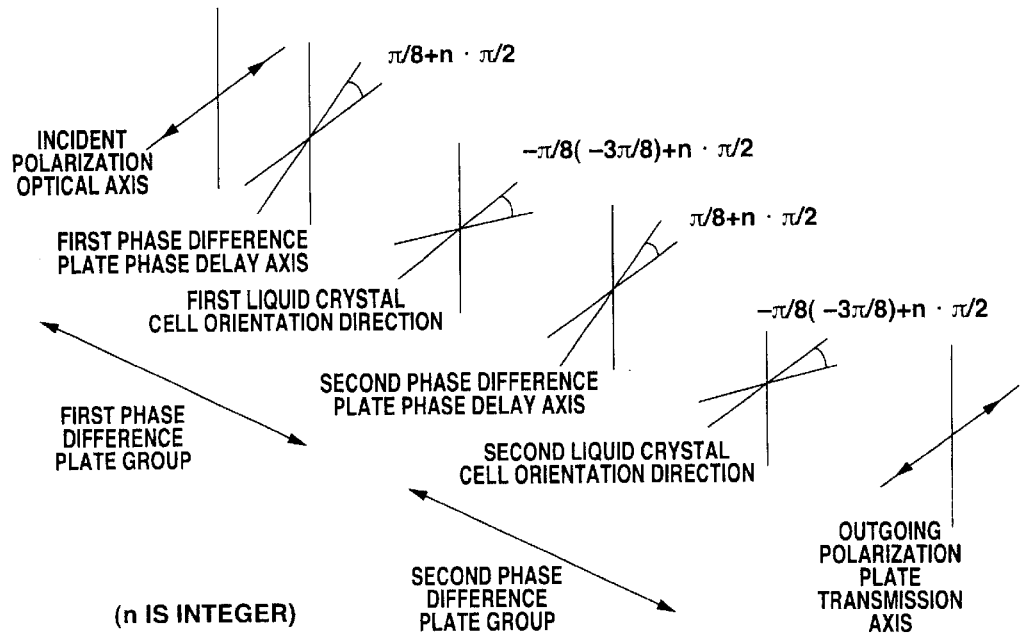
FIG. 32 is a perspective view showing a configuration of a designing example 7 of the color switching element.

Here, a designing example of switching between three colors of magenta, yellow and white, employing an in-plane changeover switch, as shown in FIG. 32, is shown. If the first phase difference plate set and the second phase difference plate set are set to magenta and yellow, the directions of the liquid crystal orientation are indicated by the following combinations: That is, the retardation of the first and second phase difference plates is set to magenta (825 nm) and to yellow (596 nm).

That is, the first phase difference plate and the first liquid crystal cell are sequentially combined and layered to form a first phase difference plate set, the second phase difference plate and the second liquid crystal cell are sequentially combined and layered to form a second phase difference plate set, and respective angles of the delay phase axes are set.

The delay phase axis of the first phase plate is set to $\{(\pi/8)+n\}\cdot(\pi/2)$, where n is an integer.

The delay phase axis of the first liquid crystal cell is set to $\{(-\pi/8)+n\}\cdot(\pi/2)$, where n is an integer;

$\{(-3\pi/8)+n\}\cdot(\pi/2)$, where n is an integer.

The delay phase axis of the second phase plate is set to $\{(\pi/8)+n\}\cdot(\pi/2)$, where n is an integer.

The delay phase axis of the second phase plate is set to $\{(-\pi/8)+n\}\cdot(\pi/2)$, where n is an integer, and $\{(-3\pi/8)+n\}\cdot(\pi/2)$, where n is an integer.

If the direction of orientation of the first liquid crystal cell is −22.5° and that of the second liquid crystal cell is −67.5°, an output is magenta.

If the direction of orientation of the first liquid crystal cell is −67.5° and that of the second liquid crystal cell is −22.5°, an output is yellow.

If the direction of orientation of the first liquid crystal cell is −67.5° and that of the second liquid crystal cell is also −67.5°, an output is white.

In the above-described first to seven designing embodiments, polarization plates of neutral characteristics are used. Alternatively, colored polarization plates may also be used in combination. That is, since the first to seventh designing embodiments deal with magenta-cyan color switching, it is also possible to improve the transmission factor of the red wavelength range by using a color polarization plate not having the polarization capability in the red wavelength range, that is not exhibiting the absorption.

Eighth Designing Embodiment

Figure 33:
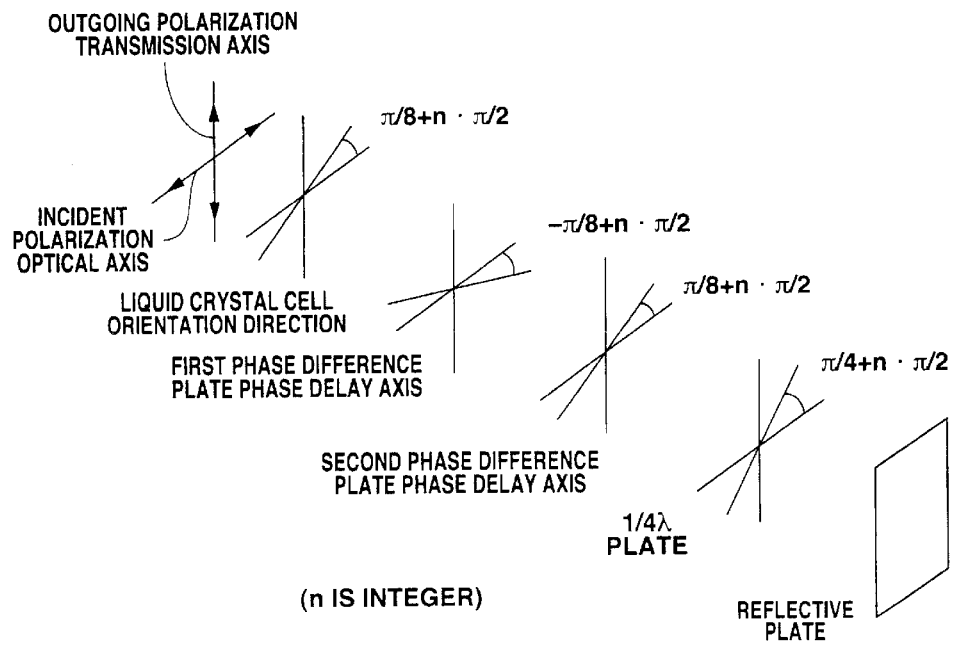
FIG. 33 is a perspective view showing a configuration of a designing example 8 of the color switching element.
Figure 34:
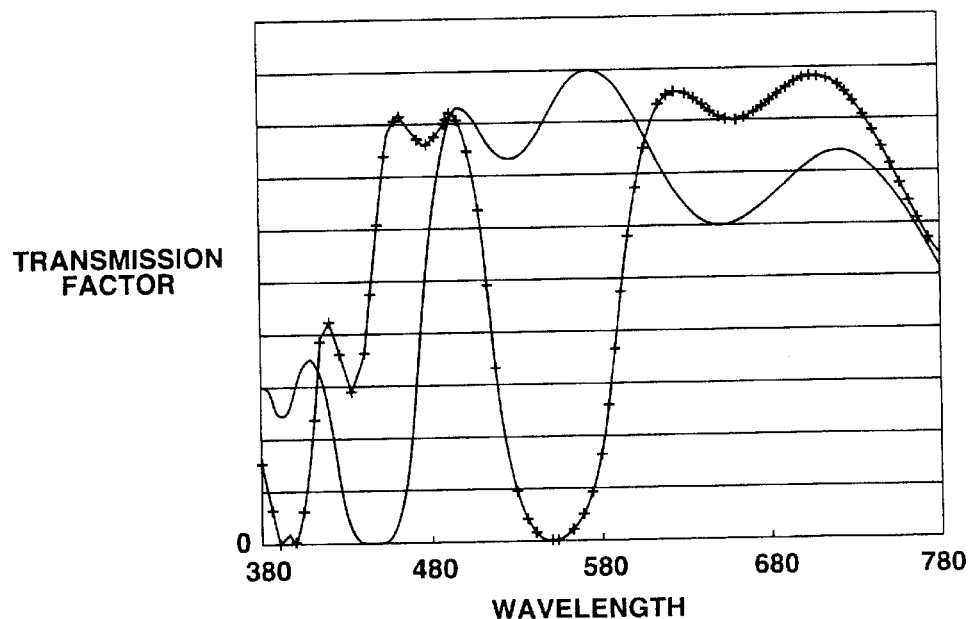
FIG. 34 is a graph showing the spectrographic transmission factor of the polarizing plate shown in FIG. 33.

This designing embodiment is directed to a reflection type color switching device, as shown in FIG. 33. And of the phase difference plate is set to yellow (596 nm). The liquid crystal cell retardation is switched between 596 nm and 825 nm. FIG. 32 shows the spectroscopic transmission factor.

The liquid crystal cell, first and second phase difference plates and a quarter wave plate (λ/4 plate) are sequentially combined and layered and respective angles of the delay phase axes are set.

The delay phase axis of the liquid crystal cell is set to $\{(\pi/8)+n\}\cdot(\pi/2)$, where n is an integer.

The delay phase axis of the first phase plate is set to $\{(-\pi/8)+n\}\cdot(\pi/2)$, where n is an integer.

The delay phase axis of the second phase plate is set to $\{(\pi/8)+n\}\cdot(\pi/2)$, where n is an integer.

The delay phase axis of the quarter wave plate is set to $\{(\pi/4)+n\}\cdot(\pi/2)$, where n is an integer.

In the above-described respective color separation devices and color separating devices, it is possible to reduce the reflection on an interface to improve light exploitation efficiency by optical matching to other optical components.

The light exploitation efficiency can similarly be improved by bonding to the polarization plate. However, in the case of the polarization plate, temperature rise is produced depending on an output of the light source.

It should be determined in consideration of heat resistance of optical components whether a polarization plate is to be isolated or bonded. An adhesive of the UV curable type is extensively used for optical matching with respect to optical components.

A specified designing embodiment is shown for the case of the first embodiment. As the color separating device, a red-cyan separation device of Color Select" manufactured by Color Link Inc., is used, whilst a color separating device shown above as the second designing embodiment is used. As a light source, a high-pressure mercury lamp is used. FIG. 33 shows a color reproduction range in this case. Here, chromaticity points of red, green and blue represent a gamut of color reproduction. The chromaticity point for white is the white on synthesis of these three colors. The chromaticity point indicated by a light source is the chromaticity point of the light source. Although red color rendition is poor in this light source, it is possible to improve the white balance by arraying red in the first liquid crystal panel LV1, by arraying green and blue in the second liquid crystal panel LV2 and by doubling the red light using time.

The light exploitation efficiency of the entire optical system is now explained. An output light beam of an image projection apparatus is represented by the following equation:

[output light beam]=[light beam of the light source]×[optical system efficiency]×[illumination efficiency]

Here, the [optical system efficiency] means the light utilization efficiency of the entire image projection apparatus, with the illumination efficiency being a function of ALV·NA2, where ALV is an area of a display portion of a liquid crystal panel. The NA (numerical aperture) is equal to sinθ (NA=sinθ), θ being the maximum angle of the illumination light in the display unit of the liquid crystal panel. The relation between the illumination efficiency and the ALV-NA2 is that the larger the value of NA, the higher is the illumination efficiency. It is noted that NA is determined by the F-number of the projection lens, that is NA=0.5/[F number].

If the diameter of the projection lens is constant, the F-number becomes smaller and the value of NA becomes larger the shorter the back-focus length corresponding to the distance between the last surface of the projection lens and the liquid crystal panel. With an image projection device of the two plate type, the distance taken up by the optical system responsible for color separation and synthesis can be shorter than with the image projection device of the three plate type employing three liquid crystal panels, thus enabling the back-focus length to be diminished.

With use of F1.7 and F3.1 of practical projection lenses of the two plate type and for the three plate type, respectively, the following Table 1 shows the comparison of the efficiency of the three plate reflection type and the two-plate type.

TABLE 1

|  | two-plate | three-plate |
| --- | --- | --- |
| color separation efficiency | 0.52 | 0.7 |
| illumination efficiency | 1.48 | 1 |
| overall efficiency | 0.77 | 0.7 |

The size of the liquid crystal panel is 0.9 inch in terms of a diagonal line length. As a light source, a high-pressure mercury lamp, with an arc length of 1 mm, was used. The color separation synthesis efficiency of the two plate type is found from filter characteristics in the above-mentioned second designing embodiment. In the image projection apparatus according to the present invention, the overall efficiency as a product of the color separation synthesis efficiency and the illumination efficiency can be equivalent to or even superior to that of the three plate type.

The maximum luminosity of the white display can be further improved by adding white as in the case of the color switching shown in the sixth embodiment.

Figure 35:
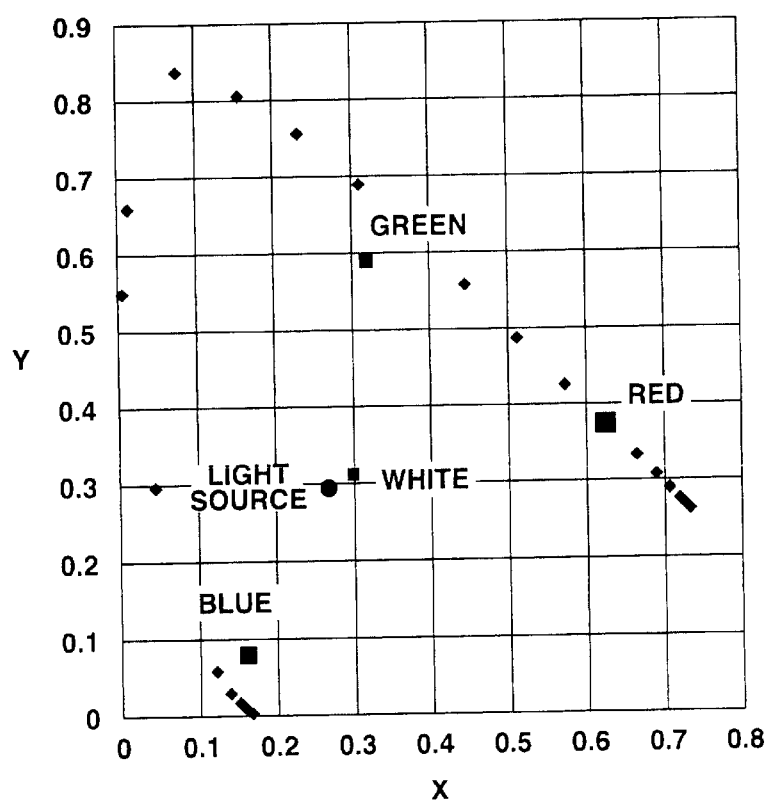
FIG. 35 is a chromaticity diagram showing a color reproducing range in the image projection apparatus.
Figure 36:
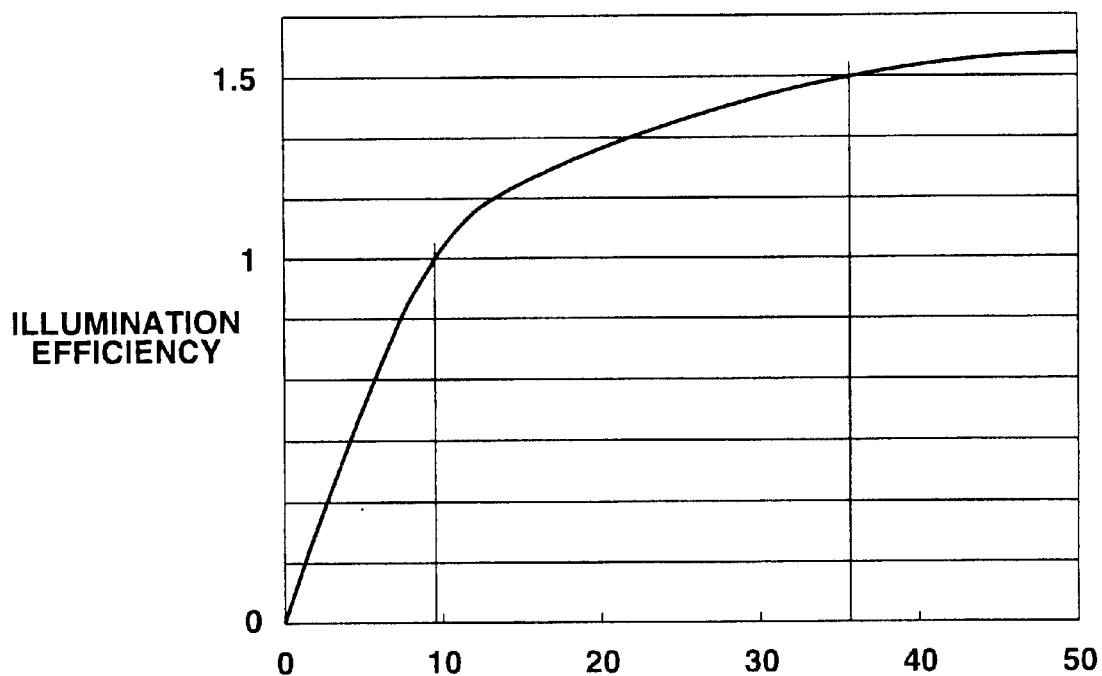
FIG. 36 is a graph showing the illumination efficiency in the image projection apparatus.
Figure 37:
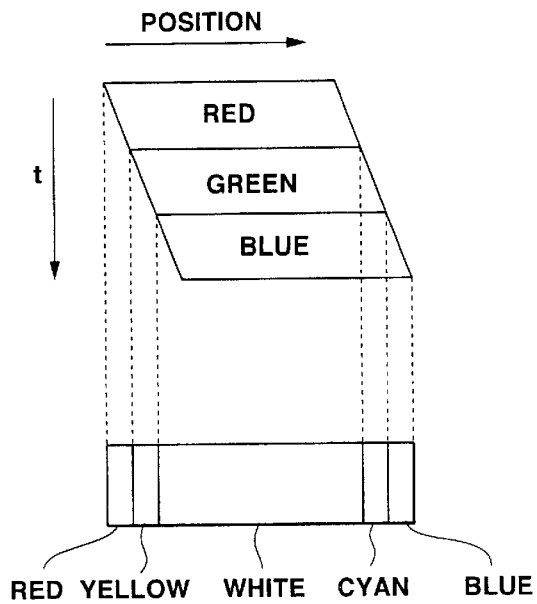
FIG. 37 is a graph showing the cause for an edge color (color breakup) in a tri-color field sequential color representation.

The so-called color breakup as a problem in time division color representation is explained. As an example, assume a case in which a white window is moved on the black background in the case of a field sequential color display of three prime colors of red, green and blue (RGB). As for the relation between a "position" and a "time" in this case, the relative position is shown with a point of observation at each time instant as a reference, assuming that an eyeball has completely followed the movement of a displayed object (window), as shown in FIG. 35. By an integration effect of the human visual system, light stigmatism within a short time period less than tens of msec can be integrated substantially completely. The result is that red and yellow coloring and cyan and blue coloring are presented on both ends of the white window.

Figure 38:
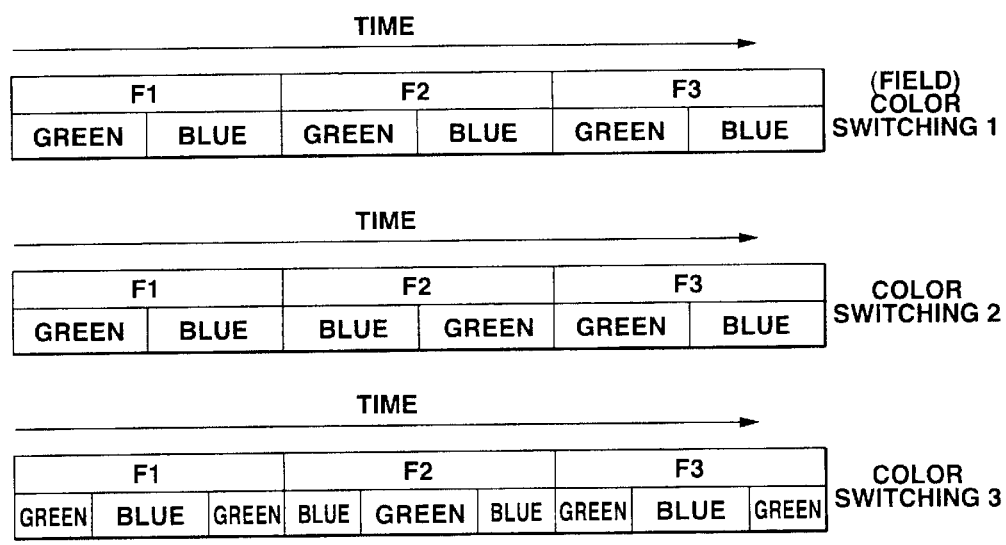
FIG. 38 is a graph showing a prime color switching pattern in the color switching element.
Figure 39:
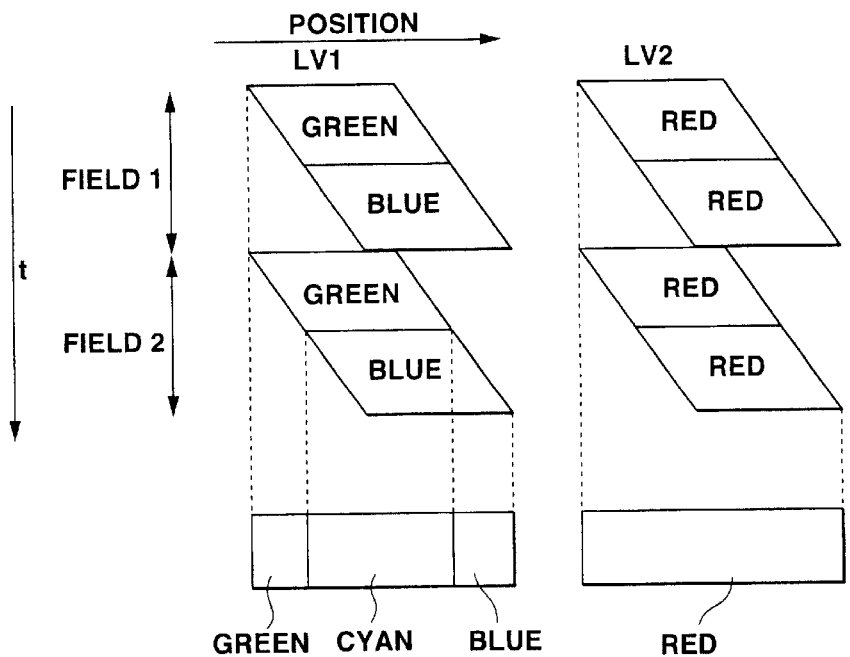
FIG. 39 is a graph showing the occurrence of the edge color (color breakup) in a tricolor field sequential color representation.

FIG. 38 shows an illustrative color switching pattern in the case of the two plate type. In the two plate type, color breakup is diminished as compared to the case of three plate color switching, however, it is not eliminated completely. For example, if the switching is a repetition of a sole pattern of green-blue, as in the case of "color switching 1", and a cyan window is moved, blue coloring and green coloring are produced on both ends of the window, whereas, if a white window is moved, magenta coloring and yellow coloring are produced on both ends of this window, as indicated in the position-time domain in FIG. 39.

Figure 40:
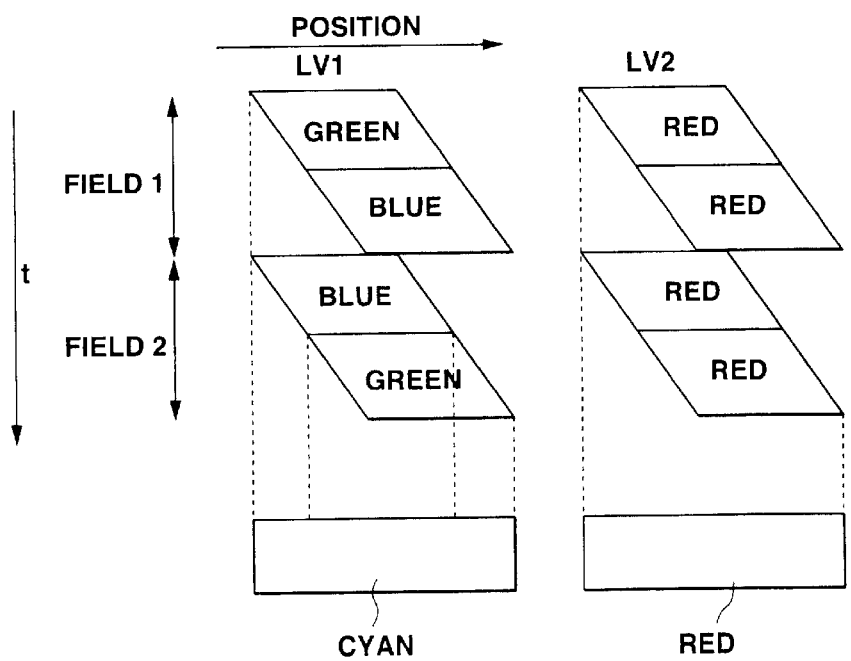
FIG. 40 is a graph showing the state in which the edge color (color breakup) in the image projection apparatus according to the present invention is prevented by the adoption of the [color switching 2] in FIG. 38.
Figure 41:
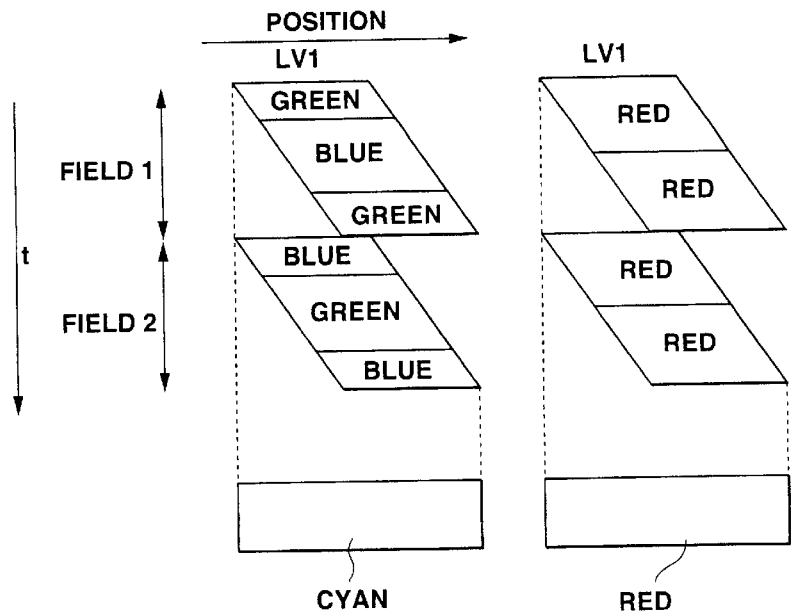
FIG. 41 is a graph showing the state in which the edge color (color breakup in the image projection apparatus according to the present invention is prevented by the adoption of the [color switching 3] in FIG. 38.

However, if the switching is a repetition of a first pattern of green-blue and a second pattern of blue-green, as in the case of "color switching 2", or a repetition of a first pattern of green-blue-green and a second pattern of blue-green-blue, as in the case of "color switching 3", edge color breakup is not produced in the integrated result of plural fields, as indicated in the position-time domain in FIGS. 40 and 41.

The difference between the color switching 2—color switching 3 and color switching 1 is that color switching during one field period is carried out an odd number of times, that is once for color switching 2 and three times for color switching 3, that is that the prime color components selected in accordance with plural sorts of the switching patterns repeated at a constant period are changed, at the same time as the prime color components selected at each time point during the executing period of one switching pattern differs from the prime color component selected at a corresponding time point during the time of execution of the next switching pattern.

That is, since the color at the same time point in a field is switched from field to field in the color switching 2 and color switching 3, edge color breakup is not produced on integration of plural fields, even if color breakup occurs from field to field.

Figure 42:
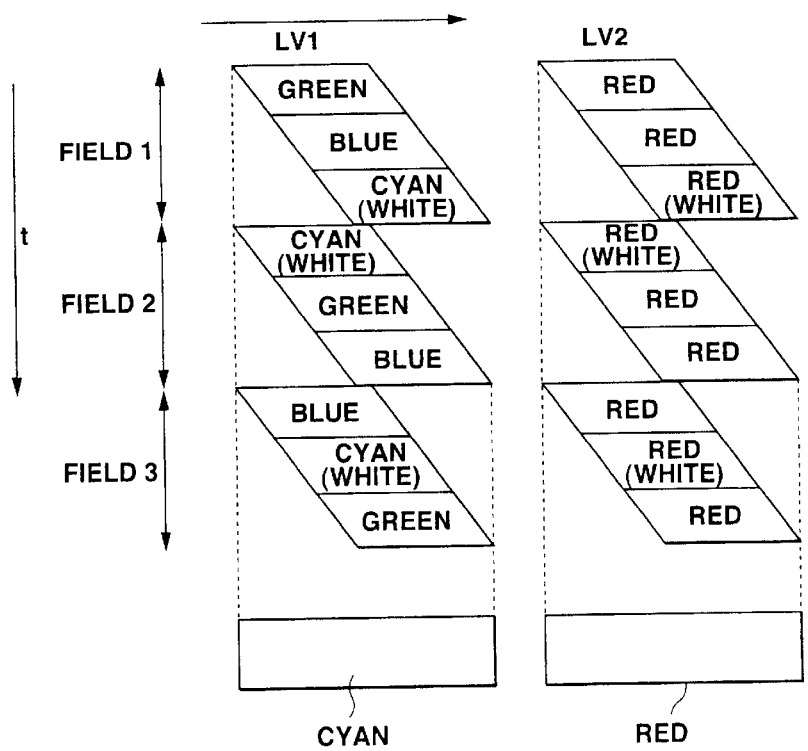
FIG. 42 is a graph showing the state in which the edge color (color breakup)in the image projection apparatus according to the present invention is prevented in case of switching between two colors and white.
Figure 43:
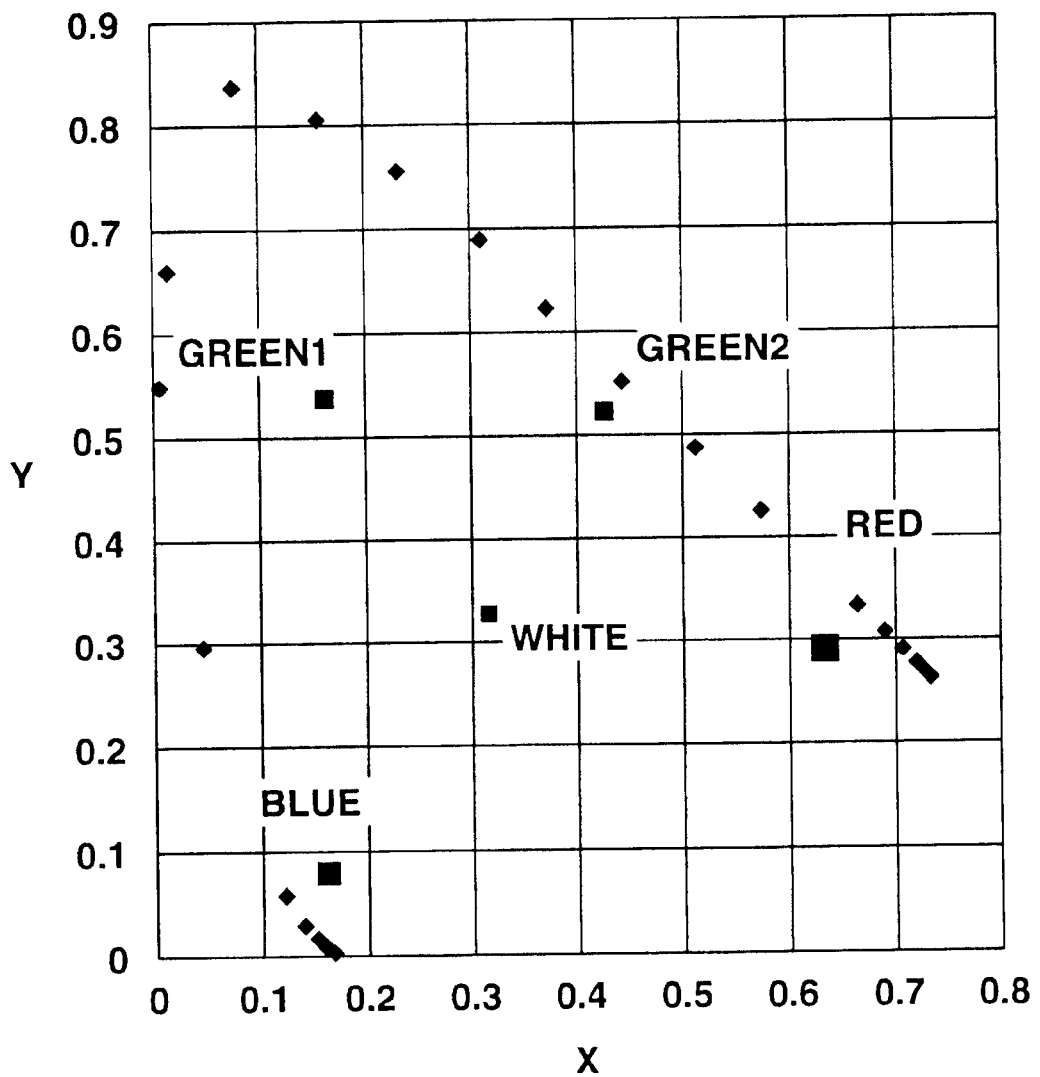
FIG. 43 is a chromaticity diagram showing the color close to a complementary color in the color switching of the image projection apparatus according to the present invention.

In case of switching between two colors and white, edge color breakup is not produced by outputting so that the color at the same time point in the field will be switched from field to field, as shown in FIG. 42. In FIG. 42, [cyan (white)] and [red (white)] indicate that, although the white signal is modulated in each liquid crystal panel, the fact is that a white image is produced on synthesis of cyan and res.

In the above-described case of color switching of the fourth embodiment, described above, color breakup can be made less outstanding, even if the white window is displayed, by approaching the color simultaneously displayed to a complementary color. The color close to a complementary color is blue to green 2 or red to green 1, these being approximately complementary colors to each other. By demonstrating these two colors simultaneously, the "color breakup" can be diminished.

What is claimed is:

1. An image projection apparatus comprising:
    temporal color separation means and spatial color separation means; wherein, during a first time period:
    said temporal color separation means receives incident light, said incident light having a plurality of spectral bands, said plurality of spectral bands including a first spectral band, a second spectral band and a third spectral band, said first, second and third spectral bands being polarized in a shared polarization axis,
    said temporal color separation means removes said second spectral band from said received incident light, said first and third spectral bands remaining after removal of said second spectral band, said remaining first and third spectral bands traveling along the same optical path and being polarized in the same polarization axis, and
    said spatial color separation means split said remaining first spectral band from said remaining third spectral band by polarizing said remaining third spectral band from said common polarization axis to a polarization axis different from said common polarization axis, first modulation incident light being said remaining first spectral band, and second modulation incident light being said remaining third spectral band polarized in said another polarization axis.

2. The image projection apparatus according to claim 1 wherein, prime color component selection means includes said temporal color separation means and said spatial color separation means, said plurality of spectral bands being prime color components, said temporal color separation means sequentially changing one prime color component as time lapses.

3. The image projection apparatus according to claim 1 wherein, during a second time period different from said first time period:

said temporal color separation means receives said incident light and removes said first spectral band from said received incident light, said second and third spectral bands remaining after removal of said first spectral band, said remaining second and third spectral bands travel along another same optical path and are polarized in another same polarization axis, and said spatial color separation means split said remaining second spectral band from said remaining third spectral band by polarizing said remaining third spectral band from said another polarization axis to a polarization axis different from said another polarization axis, and said first modulation incident light is said remaining second spectral band, and said second modulation incident light is said remaining third spectral band polarized in said another polarization axis.

4. The image projection apparatus according to claim 3 wherein, said another same optical path is said same optical path, and said another same polarization axis is said same polarization axis.

5. The image projection apparatus according to claim 3 further comprising:

modulation means, said modulation means including first spatial modulation means and second spatial modulation means, said first spatial modulation means receiving said first modulation incident light and said second spatial modulation means receiving said second modulation incident light.

6. The image projection apparatus according to claim 5 further comprising:

projection means for synthesizing and projecting said first and second modulation incident lights that have been processed by said first and second spatial modulation means; and said first and second spatial modulation means performing spatial modulation on an image corresponding to one respectively different spectral band of said plurality of spectral bands in each operating state of said temporal color separation means.

7. The image projection apparatus according to claim 1 wherein a spectral band of said plurality of spectral bands is a prime color component.

8. The image projection apparatus according to claim 2 wherein, in sequentially changing one prime color component with a lapse of time, said temporal color separation means in sequentially changing one prime color component with said lapse of time provides for a period before completion of said change during which the state of polarization of said one prime color component is the same as the state of polarization of the other two prime color components.

9. The image projection apparatus according to claim 2 wherein the temporal color separation means provides for a time period during which the prime color component with a relatively low output in the split component of the incident light on the prime color component selection means reaches the spatial modulation means which is longer than the time during which the remaining prime color components reach the spatial modulation means.

10. The image projection apparatus according to claim 2 further comprising:

a light source for radiating the incident light on said prime color component selection means; and said temporal color separation means being located on an optical path between said light source and the spatial color separation means.

11. The image projection apparatus according to claim 2 wherein the spatial color separation means and the temporal color separation means are affixed optically to other optical components.

12. The image projection apparatus according to claim 2 wherein said temporal color separation means includes a first filter for interrupting the first prime color component and transmitting second and third prime color components, in the incident light, and a second filter for interrupting the second prime color component and transmitting the first and third prime color components, in the incident light, these filters being sequentially positioned on the optical path to sequentially change the one prime color component as time elapses.

13. The image projection apparatus according to claim 2 wherein said temporal color separation means includes a color switching device which provides for a polarized state of one prime color component different from the polarized state of the other two prime color components in the incident light and which sequentially changes said one prime color component with a lapse of time, and a polarization selection device which transmits only the light beam having a specified polarization direction, said temporal color separation means being fed with only with a light beam in a pre-set polarization state.

14. The image projection apparatus according to claim 13 wherein said color switching device is made up of two liquid crystal cells.

15. The image projection apparatus according to claim 14 wherein the azimuths of liquid crystal orientation of two liquid crystal cells are such that, with the azimuth of liquid crystal polarization of the incident light as reference, one of the azimuths is $\{(\pi/8)+n)\cdot\pi/2\}$ where n is an integer, and with the other azimuth being $\{(-\pi/8)+n)\cdot\pi/2\}$, where n is an integer.

16. The image projection apparatus according to claim 14 wherein the two liquid crystal cells are of the products $\Delta nd$ of the refractive index anisotropy $\Delta n$ and the thickness d equal to each other.

17. The image projection apparatus according to claim 14 wherein, in each liquid crystal cell, an effective value of the product $\Delta nd$ of the refractive index anisotropy $\Delta n$ and the thickness d after application of an electrical field is approximately an odd number times $\lambda/2$ where $\lambda$ is the wavelength of the interrupting light beam.

18. The image projection apparatus according to claim 14 further comprising:

a sole driving circuit for driving two liquid crystal cells in parallel.

19. The image projection apparatus according to claim 13 wherein the color switching device includes a phase difference plate and one or more liquid crystal cells.

20. The image projection apparatus according to claim 19 wherein the azimuth of the liquid crystal orientation of the liquid crystal cell is {(π/4)+n}·(π/2), with the direction of polarization of the incident light as a reference, where n is an integer.

21. The image projection apparatus according to claim 19 wherein the variation in the effective value of the product Δnd of the refractive index anisotropy Δn and the thickness d caused by the switching of the liquid crystal cell voltage is approximately an odd number times λ/2, where λ is the wavelength of the switched light beam.

22. The image projection apparatus according to claim 13 wherein the temporal color separation means is made up of a plurality of phase difference plates and two liquid crystal cells and switches between two prime color components and the white color;

the azimuth of orientation of said two liquid crystal cells being

{(π/4)+n}·(π/2), with the direction of polarization of the incident light as a reference, where n is an integer.

23. The image projection apparatus according to claim 22 wherein a variation in the effective value of the product Δnd of the refractive index anisotropy Δn and the thickness d caused by the switching of the liquid crystal cell voltage is selected from a value equal to 0, a value equal to the phase difference plate and a value approximately equal to an odd number times λ/2, where λ is the wavelength of the light beam to be switched.

24. The image projection apparatus according to claim 13 wherein each color switching device is made up of two phase difference plate sets, with each set being made up of a plurality of phase difference plates and a sole phase difference plate.

25. The image projection apparatus according to claim 24 wherein each phase difference plate set switches between a prime color component and the white color;

said temporal color separation means switching between two prime color components and the white color due to the combination of the two phase difference plate sets.

26. The image projection apparatus according to claim 24 wherein, in the respective phase difference plate sets, the azimuth of orientation of each phase difference plate in one of the phase difference plate sets is {(π/8)+n}·(π/2), and, in the other phase difference plate set, the azimuth of orientation of each phase difference plate is {(−π/8)+n}·(π/2), with the azimuth of polarization of the incident light as a reference, where n is an integer, with the azimuth of orientation of each liquid crystal cell arranged between respective phase difference plates being {(π/2+n)}·(π/2), with the azimuth of polarization of the incident light as a reference, where n is an integer.

27. The image projection apparatus according to claim 24 wherein the product Δnd of the refractive index anisotropy Δn and the thickness d of each phase difference plate constituting each phase difference plate set and an effective value of the product Δnd of the refractive index anisotropy Δn and the thickness d of the liquid crystal cell are approximately equal to each other when white color is displayed, and wherein, if any color is displayed, the effective value of the product Δnd of the refractive index anisotropy Δn and the thickness d of the liquid crystal cell is 0.

28. The image projection apparatus according to claim 13 wherein the color switching device is made up of plural phase difference plates and a sole liquid crystal cell, and wherein the liquid crystal cell is in-plane switching in which changes on a liquid crystal director occurs in a plane.

29. The image projection apparatus according to claim 28 wherein the azimuth of orientation of the liquid crystal cell is switched between (0+π)·(π/2), where n is an integer, and {(π/4)+n}·(π/2), where n is an integer, with the azimuth of polarization of the incident light as a reference.

30. The image projection apparatus according to claim 13 wherein the color switching device is made up of plural phase difference plates and a sole liquid crystal cell, and wherein the liquid crystal cell is in-plane switching in which changes on a liquid crystal director occurs in a plane.

31. The image projection apparatus according to claim 30 wherein each phase difference plate set switches between a prime color component and the white color, and wherein the temporal color separation means switches between the two prime color components and the white color due to combination of the phase difference plate sets.

32. The image projection apparatus according to claim 30 wherein the product Δnd of the refractive index anisotropy Δn and the thickness d of the phase difference plate constituting each phase difference plate set and the product Δnd of the refractive index anisotropy Δn and the thickness d of the liquid crystal cell are approximately equal to each other.

33. The image projection apparatus according to claim 30 wherein the azimuth of orientation of the phase difference plate of each phase difference plate set liquid crystal cell is switched at {(π/8)+n}·(π/2), where n is an integer, whilst the azimuth of orientation of the liquid crystal cell is switched between {(−π/8)+n)·(π/2), where n is an integer, and {(−5π/8)+n}·(π/2), where n is an integer, with the azimuth of polarization of the incident light as a reference.

34. The image projection apparatus according to claim 13 wherein the color switching device is made up of a phase difference plate, a liquid crystal cell and a reflective plate.

35. The image projection apparatus according to claim 34 wherein the temporal color separation means includes a polarizing beam splitter as a polarization selection device and wherein the light beam is split in said polarizing beam splitter responsive to the polarization state switched by a liquid crystal cell.

36. The image projection apparatus according to claim 13 wherein at least one of the spatial modulation means modulates the intensity of the incident light beam responsive to an image corresponding to one prime color component in said temporal color separation means in synchronism with a change in said one prime color component.

37. The image projection apparatus according to claim 36 further comprising:

a light source emitting white light which proves the incident light to prime color component selection means;

the white light from said light source is incident on said temporal color separation means; and wherein two other prime color components other than the one prime color component transmitted through said temporal color separation means are incident on spatial color separation means which then separates the respective prime color components of the incident light from each other.

38. The image projection apparatus according to claim 36 wherein projection means are provided with a polarizing beam splitter for guiding the light beam passed through the spatial color separation means to each spatial modulation means and synthesizing the light beams passed through these spatial modulation means and a projection lens for projecting a light beam passed through said polarizing beam splitter, said temporal color separation means being provided on an optical path between said polarizing beam splitter and said projection lens.

39. The image projection apparatus according to claim 36 wherein said projection means includes a polarizing beam splitter for guiding a light beam transmitted through the spatial color separation means to each spatial modulation means and synthesizing the light beam transmitted through these spatial modulation means, and a projection lens for projecting a light beam passed through the polarizing beam splitter, and wherein said temporal color separation means is positioned on the optical path between said polarizing beam splitter and the respective spatial modulation means.

40. The image projection apparatus according to claim 36 wherein said temporal color separation means changes one prime color component in accordance with a plurality of types of switching patterns repeated at a pre-set period, and wherein the prime color component selected at each time point during a time interval of execution of one switching pattern differs from the prime color component selected at an equivalent time point during a time interval of execution of the next switching pattern.

* * * * *